(12) United States Patent
Rout et al.

(10) Patent No.: US 11,663,206 B2
(45) Date of Patent: May 30, 2023

(54) DETECTING RELATIONSHIPS ACROSS DATA COLUMNS

(71) Applicant: Optum Technology, Inc., Eden Prairie, MN (US)

(72) Inventors: Swapna Sourav Rout, Bengaluru (IN); Sruti Rallapalli, Hyderabad (IN); Mrinalini M, Mysore (IN); Kirk Michael Wroblewski, Raleigh, NC (US); Bhuvaneshwari Atti Janakiram, Marlboro, NJ (US)

(73) Assignee: Optum Technology, Inc., Eden Prairie, MN (US)

(*) Notice: Subject to any disclaimer, the term of this patent is extended or adjusted under 35 U.S.C. 154(b) by 0 days.

(21) Appl. No.: 17/819,503

(22) Filed: Aug. 12, 2022

(65) Prior Publication Data

US 2022/0382749 A1 Dec. 1, 2022

Related U.S. Application Data

(63) Continuation of application No. 16/902,914, filed on Jun. 16, 2020, now Pat. No. 11,461,316.

(51) Int. Cl.

| G06F 16/00 | (2019.01) |
| G06F 16/245 | (2019.01) |
| G06F 16/22 | (2019.01) |
| G06F 16/248 | (2019.01) |
| G06N 3/04 | (2023.01) |
| G06N 3/08 | (2023.01) |

(52) U.S. Cl.
CPC .......... G06F 16/245 (2019.01); G06F 16/221 (2019.01); G06F 16/248 (2019.01); G06N 3/04 (2013.01); G06N 3/08 (2013.01)

(58) Field of Classification Search
CPC .... G06F 16/245; G06F 16/221; G06F 16/248; G06F 16/254; G06F 16/21; G06N 3/04; G06N 3/08
See application file for complete search history.

(56) References Cited

U.S. PATENT DOCUMENTS

| 10,242,016 B2 | 3/2019 | Gorelik |
| 2005/0240615 A1 | 10/2005 | Barsness et al. |
| 2018/0074786 A1 | 3/2018 | Oberbreckling et al. |
| 2018/0075104 A1 | 3/2018 | Oberbreckling et al. |
| 2019/0361971 A1 | 11/2019 | Zenger et al. |
| 2021/0390097 A1 | 12/2021 | Rout et al. |
| 2021/0397631 A1 | 12/2021 | Rout et al. |

OTHER PUBLICATIONS

Shuo Zhang, Ad Hoc Table Retrieval using Semantic Similarity, received via IDS (Year: 2018).*

(Continued)

*Primary Examiner* — Tyler J Torgrimson
(74) *Attorney, Agent, or Firm* — Alston & Bird LLP

(57) ABSTRACT

There is a need for more effective and efficient detection of cross-data-column relationships. This need can be addressed by, for example, techniques for detecting cross-data-column data relationships that utilize at least one of feature-based similarity models and deep-learning-based similarity models. The cross-data-column data relationships may be displayed to an end-user using a cross-column relationship detection user interface.

20 Claims, 20 Drawing Sheets

(56) References Cited

OTHER PUBLICATIONS

Notice of Allowance and Fee(s) Due for U.S. Appl. No. 16/904,682, dated Sep. 16, 2022, (13 pages), United States Patent and Trademark Office, US.

"Building Big Data Storage Solutions (Data Lakes) For Maximum Flexibility," Amazon Web Services, Jul. 2017, (29 pages). [Retrieved from the Internet Sep. 15, 2020] <URL: https://docs.aws.amazon.com/whitepapers/latest/building-data-lakes/data-cataloging.html>.

"How To Use Data Profile Data Sources In Azure Data Catalog," Microsoft, Aug. 1, 2019, (5 pages). [Retrieved from the Internet Sep. 15, 2020] <URL: https://docs.microsoft.com/en-us/azure/data-catalog/data-catalog-how-to-data-profile>.

"Informatica Enterprise Data Catalog," Informatica, pp. 1-7. [Retrieved from the Internet Sep. 15, 2020] <URL: https://www.informatica.com/content/dam/informatica-com/en/collateral/data-sheet/enterprise-data-catalog_data-sheet_3238en.pdf>.

"Searching The Data Lake," Data Lake Solution, (2 pages) [Article, Online]. [Retrieved from the Internet Sep. 15, 2020] <URL: http://docs.awssolutionsbuilder.com/data-lake/user-guide/searching-in-data-lake/>.

Ansari, Jasim Waheed. "Semantic Profiling In Data Lake," RWTH Aachen University, Germany, Feb. 2018, (81 pages). [Retrieved from the Internet Sep. 15, 2020] <URL: https://pdfs.semanticscholar.org/ef2d/8f74595a1123ba2e98200dff0426b72dcc21.pdf>.

Bauman, John. "What Is Data Profiling and How Does It Make Big Data Easier?" (4 pages). [Article, Online]. [Retrieved from the Internet Sep. 15, 2020] <URL: https://www.sas.com/en_us/insights/articles/data-management/what-is-data-profiling-and-how-does-it-make-big-data-easier.html#/>.

Gregg, Forest. "Modern Approaches To Schema Matching," DataMade, Dec. 12, 2017, (20 pages). [Article, Online]. [Retrieved from the Internet Sep. 14, 2020] <URL: https://datamade.us/blog/schema-matching/#:~:text=Schema%20matching%20starts%20with%20trying,score%20for%20each%20column%20pair>.

International Searching Authority, International Search Report and Written Opinion for International Application No. PCT/US2021/036360, dated Sep. 14, 2021, (12 pages), European Patent Office, Rijswijk, Netherlands.

International Searching Authority, International Search Report and Written Opinion for International Application No. PCT/US2021/036390, dated Jun. 8, 2021, (11 pages), European Patent Office, Rijswijk, Netherlands.

NonFinal Office Action for U.S. Appl. No. 16/902,914, dated Dec. 7, 2021, (24 pages), United States Patent and Trademark Office, USA.

NonFinal Office Action for U.S. Appl. No. 16/904,682, dated Mar. 21, 2022, (27 pages), United States Patent and Trademark Office, USA.

Notice of Allowance and Fee(s) Due for U.S. Appl. No. 16/902,914, dated Jun. 6, 2022, (15 pages), United States Patent and Trademark Office, US.

Pathak, Guarav. "Column Similarity: Metadata Intelligence For Curation and Consumption," Informatica, Apr. 19, 2018, (5 pages). [Article, Online]. [Retrieved from the Internet Sep. 14, 2020] <URL: https://blogs.informatica.com/2018/04/19/column-similarity-metadata-intelligence-curation-consumption/>.

Shirkhorshidi, Ali Seyed et al. "A Comparison Study On Similarity and Dissimilarity Measures In Clustering Continuous Data," PloS One, Version 10, No. 12:e0144059, Dec. 11, 2015, pp. 1-20. DOI: 10.1371/journal.pone.0144059.

Zhang, Shuo et al. "Ad Hoc Table Retrieval Using Semantic Similarity," arXiv:1802.06159v3, Mar. 8, 2018, (10 pages).

* cited by examiner

Identify character designations for the augmented data column
1001

Determine a per-character one-hot-encoding for each character designation
1002

Generate the image representation based on each per-character one-hot-encoding
1003

FIG. 13B

Data: test_column, target_source
Result: List of all columns to test_column
Initialize: similar_list_columns = list() 522
for target_column in target_source do:
  if (name_similarity_score($S_1$) == 1):
    similar_list_columns.append(target_column)
  else if (jaccard_similarity_score($S_J$) > $\lambda_J$):
    similar_list_columns.append(target_column)
  else if (weighted_score_name($S_{wn}$) > $\lambda_{wn}$):
    similar_list_columns.append(target_column)
  else if (weighted_score_no_name($S_{wnn}$) > $\lambda_{wnn}$):
    similar_list_columns.append(target_column)

FIG. 17

DETECTING RELATIONSHIPS ACROSS DATA COLUMNS

CROSS-REFERENCES TO RELATED APPLICATIONS

This patent application is a continuation of U.S. patent application Ser. No. 16/902,914, filed Jun. 16, 2020, which is incorporated by reference herein in its entirety.

BACKGROUND

Various embodiments of the present invention address technical challenges related to detection relationships across database columns. Various embodiments of the present invention disclose innovative techniques for detection relationships across database columns.

BRIEF SUMMARY

In general, embodiments of the present invention provide methods, apparatuses, systems, computing devices, computing entities, and/or the like detection relationships across database columns. Various embodiments of the present invention disclose techniques for detection relationships across database columns that utilize at least one of feature-based similarity models and deep-learning-based similarity models. The cross-data-column data relationships may be displayed to an end-user using a cross-column relationship detection user interface.

In accordance with one aspect, a method is provided. In one embodiment, the method comprises: (i) for each tagged data column of one or more tagged data columns, determining a feature-based similarity measure set comprising one or more feature-based similarity measures, wherein determining the one or more feature-based similarity measures for a particular tagged data column of the one or more tagged data columns comprises: determining one or more tagged feature values for the particular tagged data column and one or more untagged feature values for the particular tagged data column, determining a nominal similarity measure of the one or more feature-based similarity measures for the particular tagged data column based at least in part on a tagged nominal subset of the one or more tagged feature values and an untagged nominal subset of the one or more untagged feature values, determining a categorical similarity measure of the one or more feature-based similarity measures for the particular tagged data column based at least in part on a tagged categorical subset of the one or more tagged feature values and an untagged categorical subset of the one or more untagged feature values, determining a numeric similarity measure of the one or more feature-based similarity measures for the particular tagged data column based at least in part on a tagged numeric subset of the one or more tagged feature values and an untagged numeric subset of the one or more untagged feature values, determining a holistic similarity measure of the one or more feature-based similarity measures for the particular tagged data column based at least in part on the one or more tagged feature values for the particular tagged data column and the one or more untagged feature values for the untagged data column, and determining a probabilistic similarity measure of the one or more feature-based similarity measures for the particular tagged data column based at least in part on the tagged categorical subset and the untagged categorical subset; and (ii) performing, based at least in part on each feature-based similarity measure set, one or more database consolidation operations with respect to the first database and the second database to generate a consolidated database.

In accordance with another aspect, a computer program product is provided. The computer program product may comprise at least one computer-readable storage medium having computer-readable program code portions stored therein, the computer-readable program code portions comprising executable portions configured to: (i) for each tagged data column of one or more tagged data columns, determine a feature-based similarity measure set comprising one or more feature-based similarity measures, wherein determining the one or more feature-based similarity measures for a particular tagged data column of the one or more tagged data columns comprises: determining one or more tagged feature values for the particular tagged data column and one or more untagged feature values for the particular tagged data column, determining a nominal similarity measure of the one or more feature-based similarity measures for the particular tagged data column based at least in part on a tagged nominal subset of the one or more tagged feature values and an untagged nominal subset of the one or more untagged feature values, determining a categorical similarity measure of the one or more feature-based similarity measures for the particular tagged data column based at least in part on a tagged categorical subset of the one or more tagged feature values and an untagged categorical subset of the one or more untagged feature values, determining a numeric similarity measure of the one or more feature-based similarity measures for the particular tagged data column based at least in part on a tagged numeric subset of the one or more tagged feature values and an untagged numeric subset of the one or more untagged feature values, determining a holistic similarity measure of the one or more feature-based similarity measures for the particular tagged data column based at least in part on the one or more tagged feature values for the particular tagged data column and the one or more untagged feature values for the untagged data column, and determining a probabilistic similarity measure of the one or more feature-based similarity measures for the particular tagged data column based at least in part on the tagged categorical subset and the untagged categorical subset; and (ii) perform, based at least in part on each feature-based similarity measure set, one or more database consolidation operations with respect to the first database and the second database to generate a consolidated database.

In accordance with yet another aspect, an apparatus comprising at least one processor and at least one memory, including computer program code, is provided. In one embodiment, the at least one memory and the computer program code may be configured to, with the processor, cause the apparatus to: (i) for each tagged data column of one or more tagged data columns, determine a feature-based similarity measure set comprising one or more feature-based similarity measures, wherein determining the one or more feature-based similarity measures for a particular tagged data column of the one or more tagged data columns comprises: determining one or more tagged feature values for the particular tagged data column and one or more untagged feature values for the particular tagged data column, determining a nominal similarity measure of the one or more feature-based similarity measures for the particular tagged data column based at least in part on a tagged nominal subset of the one or more tagged feature values and an untagged nominal subset of the one or more untagged feature values, determining a categorical similarity measure of the one or more feature-based similarity measures for the particular tagged data column based at least in part on a tagged categorical subset of the one or more tagged feature values and an untagged categorical subset of the one or more untagged feature values, determining a numeric similarity measure of the one or more feature-based similarity measures for the particular tagged data column based at least in part on a tagged numeric subset of the one or more tagged feature values and an untagged numeric subset of the one or more untagged feature values, determining a holistic similarity measure of the one or more feature-based similarity measures for the particular tagged data column based at least in part on the one or more tagged feature values for the particular tagged data column and the one or more untagged feature values for the untagged data column, and determining a probabilistic similarity measure of the one or more feature-based similarity measures for the particular tagged data column based at least in part on the tagged categorical subset and the untagged categorical subset; and (ii) perform, based at least in part on each feature-based similarity measure set, one or more database consolidation operations with respect to the first database and the second database to generate a consolidated database.

BRIEF DESCRIPTION OF THE DRAWINGS

Figure 1:
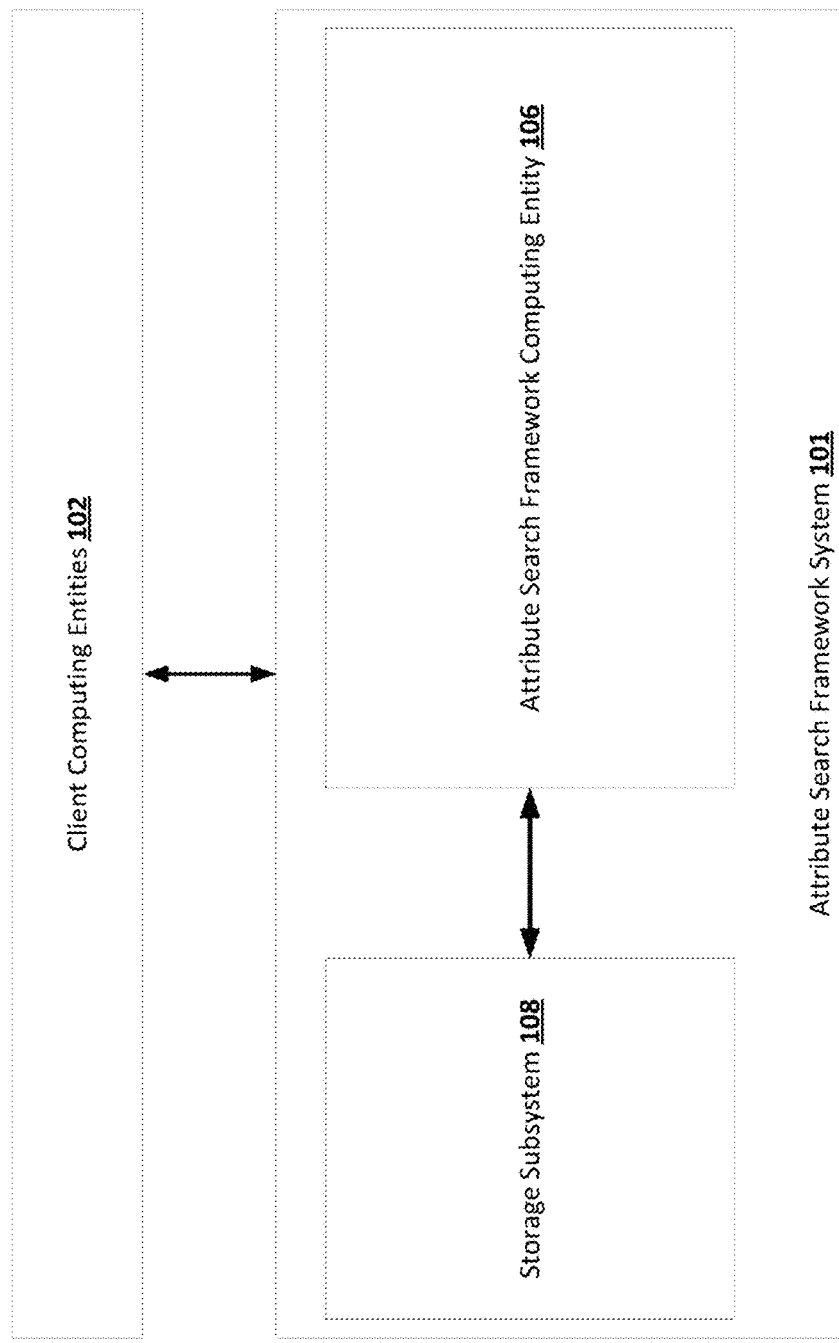

Having thus described the invention in general terms, reference will now be made to the accompanying drawings, which are not necessarily drawn to scale, and wherein:

FIG. 1 provides an exemplary overview of an architecture that can be used to practice embodiments of the present invention.

Figure 2:
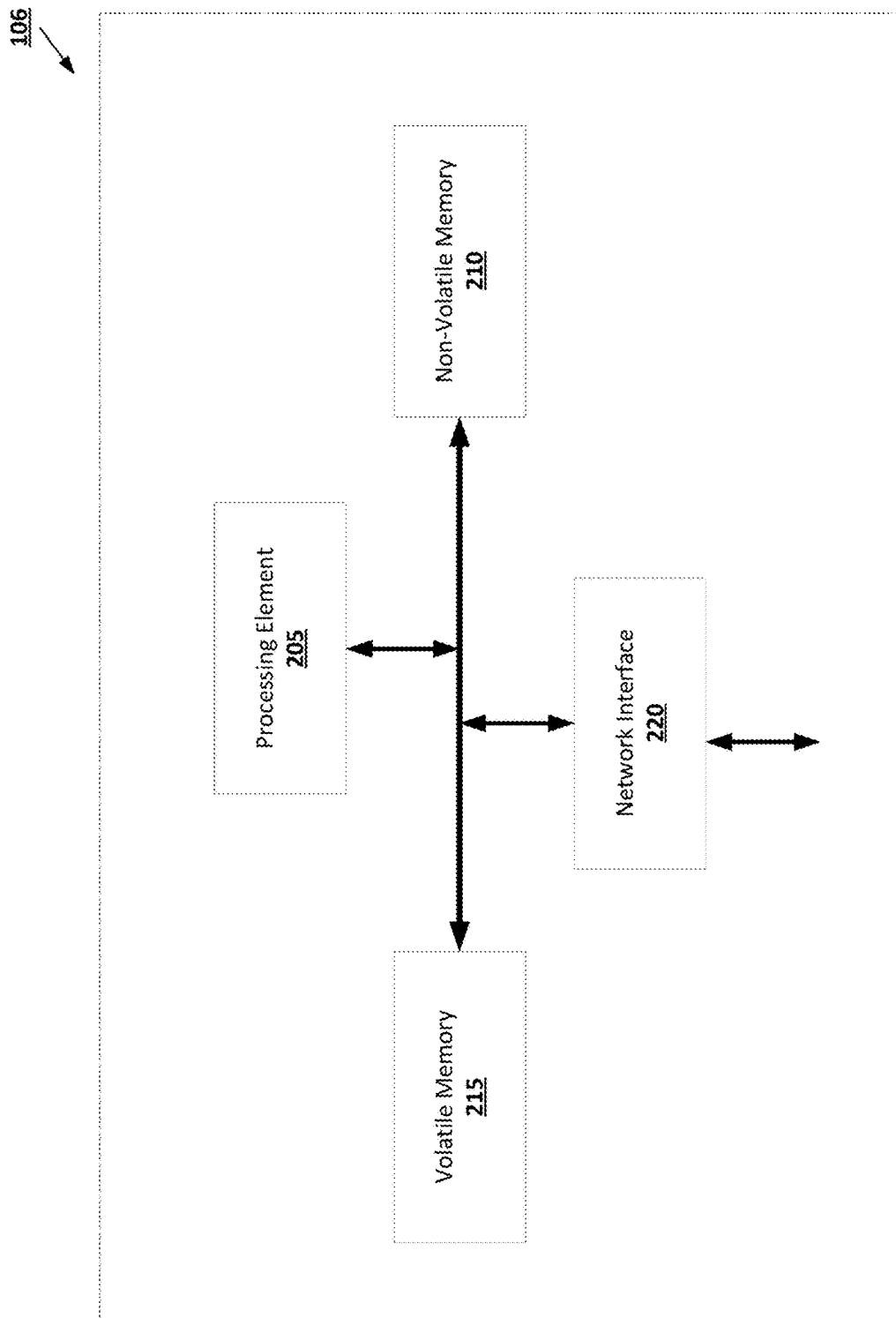

FIG. 2 provides an example attribute search framework computing entity in accordance with some embodiments discussed herein.

Figure 3:
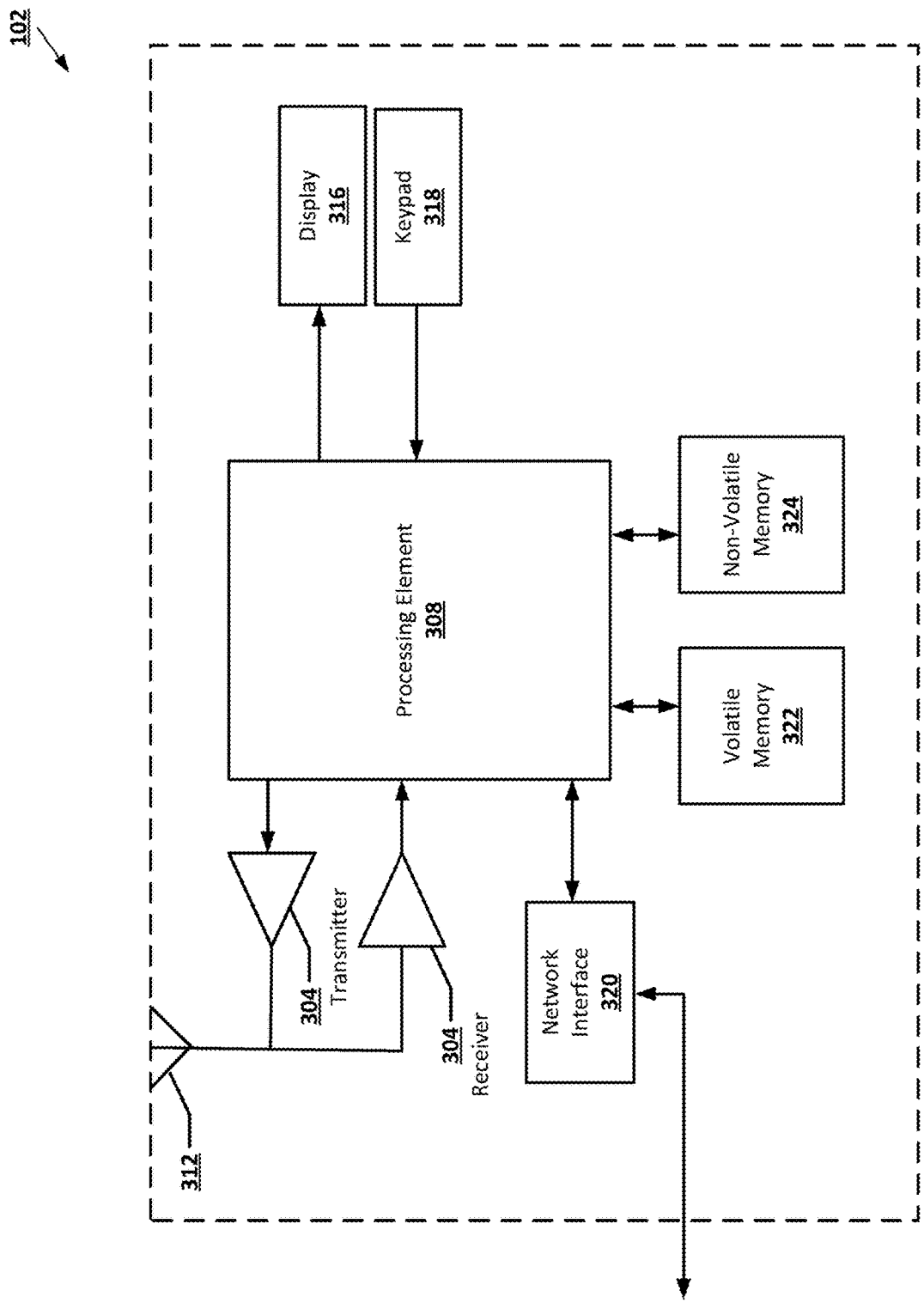

FIG. 3 provides an example client computing entity in accordance with some embodiments discussed herein.

Figure 4:
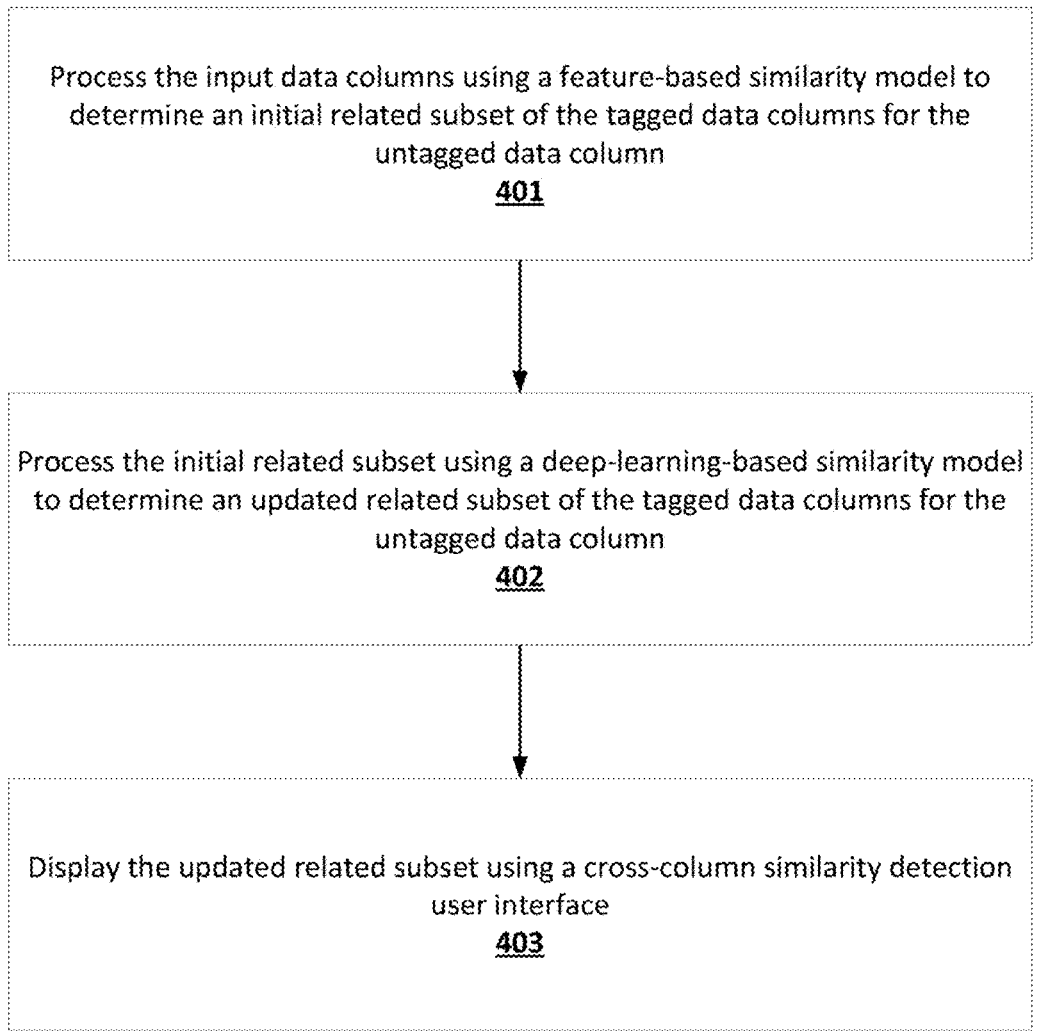

FIG. 4 is a flowchart diagram of an example process for detecting relationships across a plurality of input data columns in accordance with some embodiments discussed herein.

Figure 5:
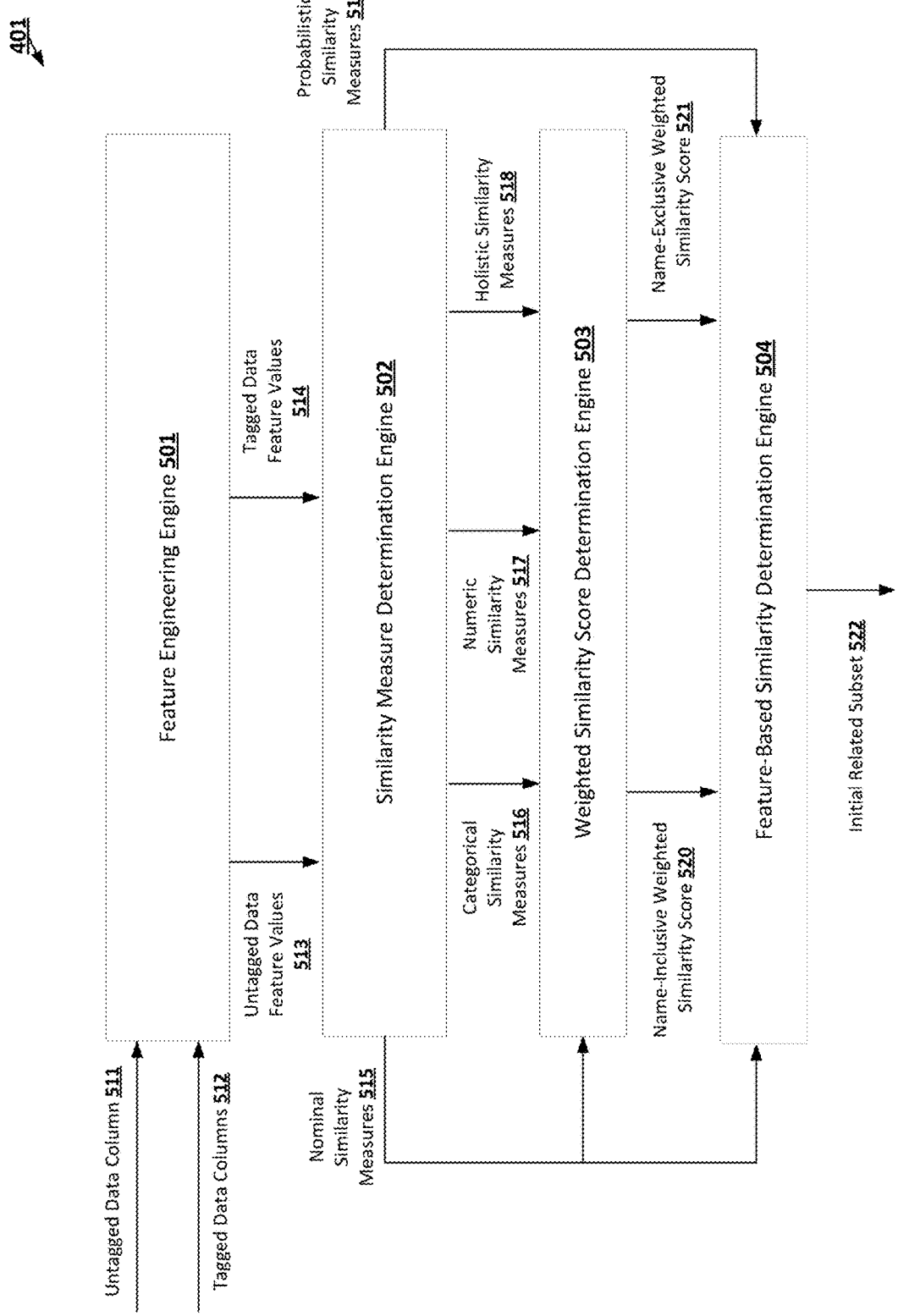

FIG. 5 is a data flow diagram of an example process for determining an initial related subset for an untagged data column using a feature-based similarity model in accordance with some embodiments discussed herein.

Figure 6:
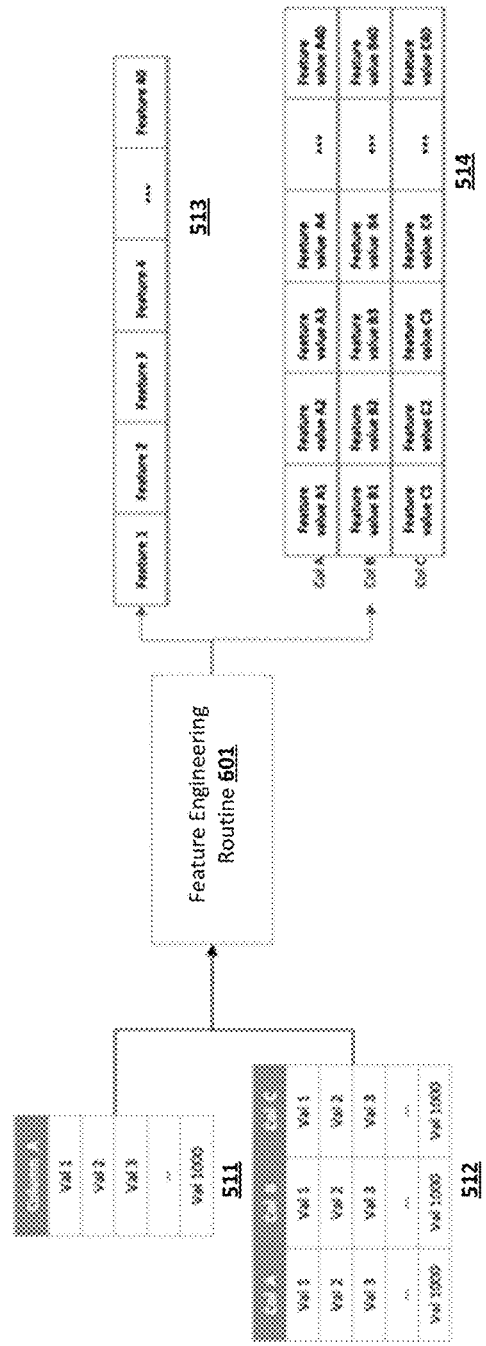

FIG. 6 provides an operational example of generating feature values for a group of data columns in accordance with some embodiments discussed herein.

Figure 7:
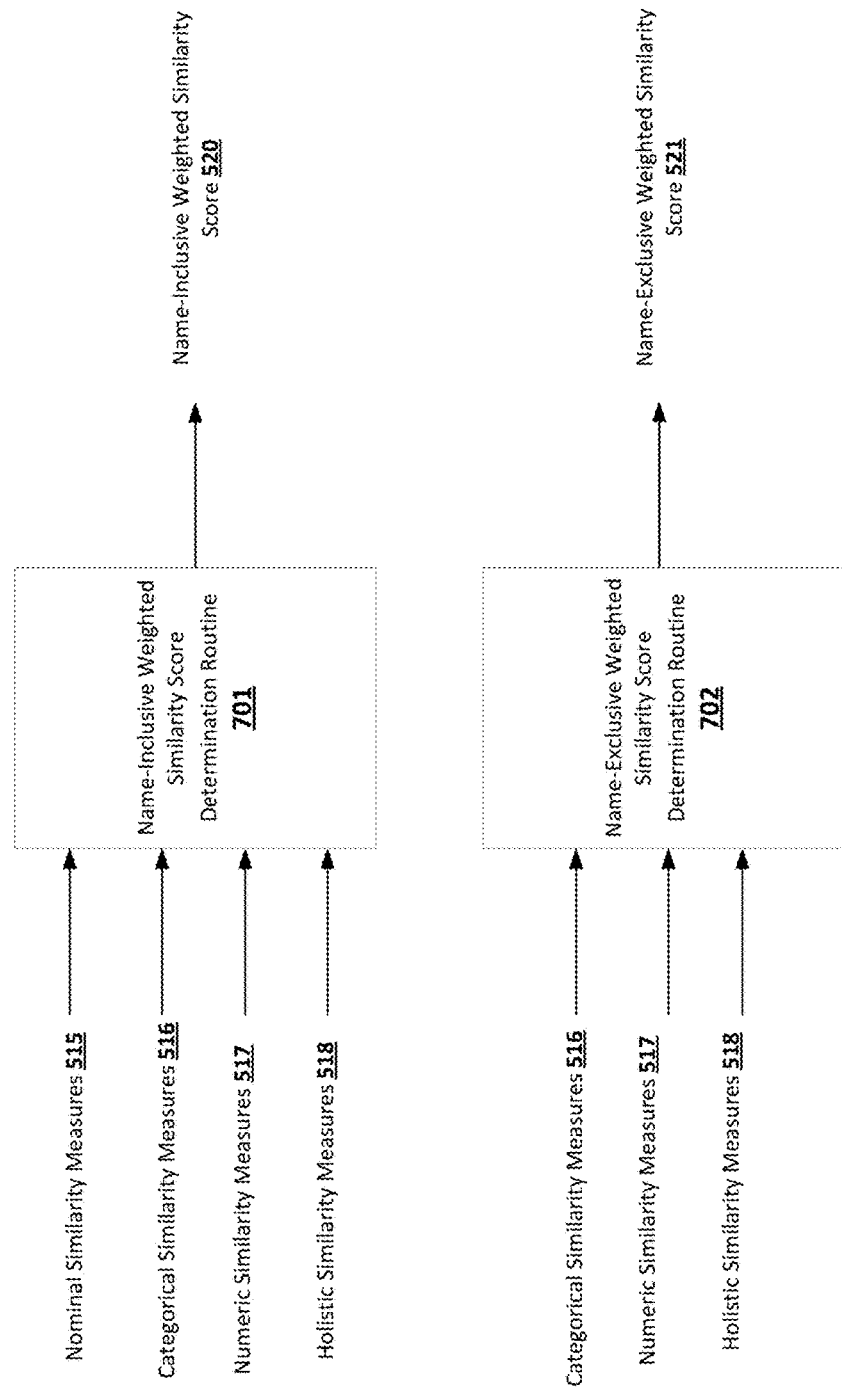

FIG. 7 provides an operational example of generating a name-inclusive weighted similarity score and a name-exclusive weighted similarity score in accordance with some embodiments discussed herein.

Figure 8:
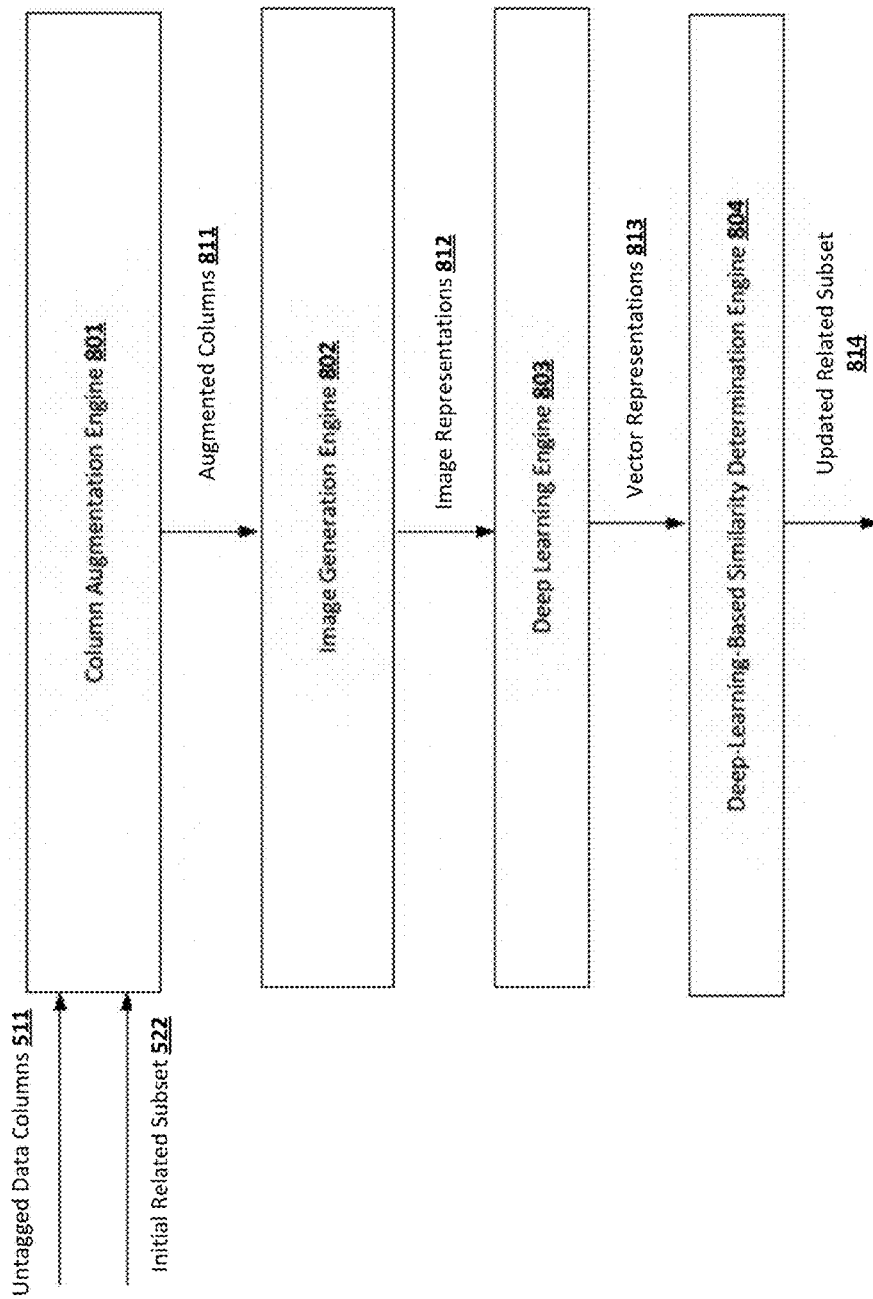

FIG. 8 is a data flow diagram of an example process for determining an updated related subset for an untagged data column using a deep-learning-based similarity model in accordance with some embodiments discussed herein.

Figure 9:
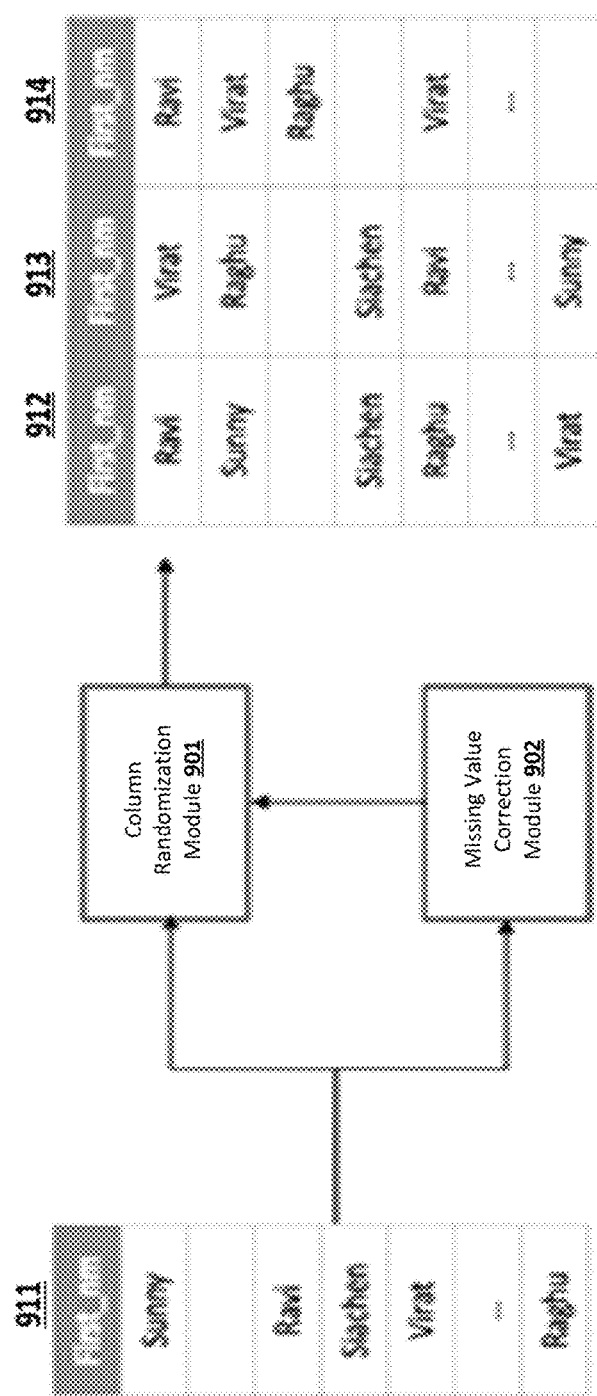

FIG. 9 provides an operational example of generating an augmented data column for an input data column in accordance with some embodiments discussed herein.

Figure 10:
Figure 10:

FIG. 10 is a flowchart diagram of an example process for generating an image representation for an augmented data column in accordance with some embodiments discussed herein.

Figure 11:
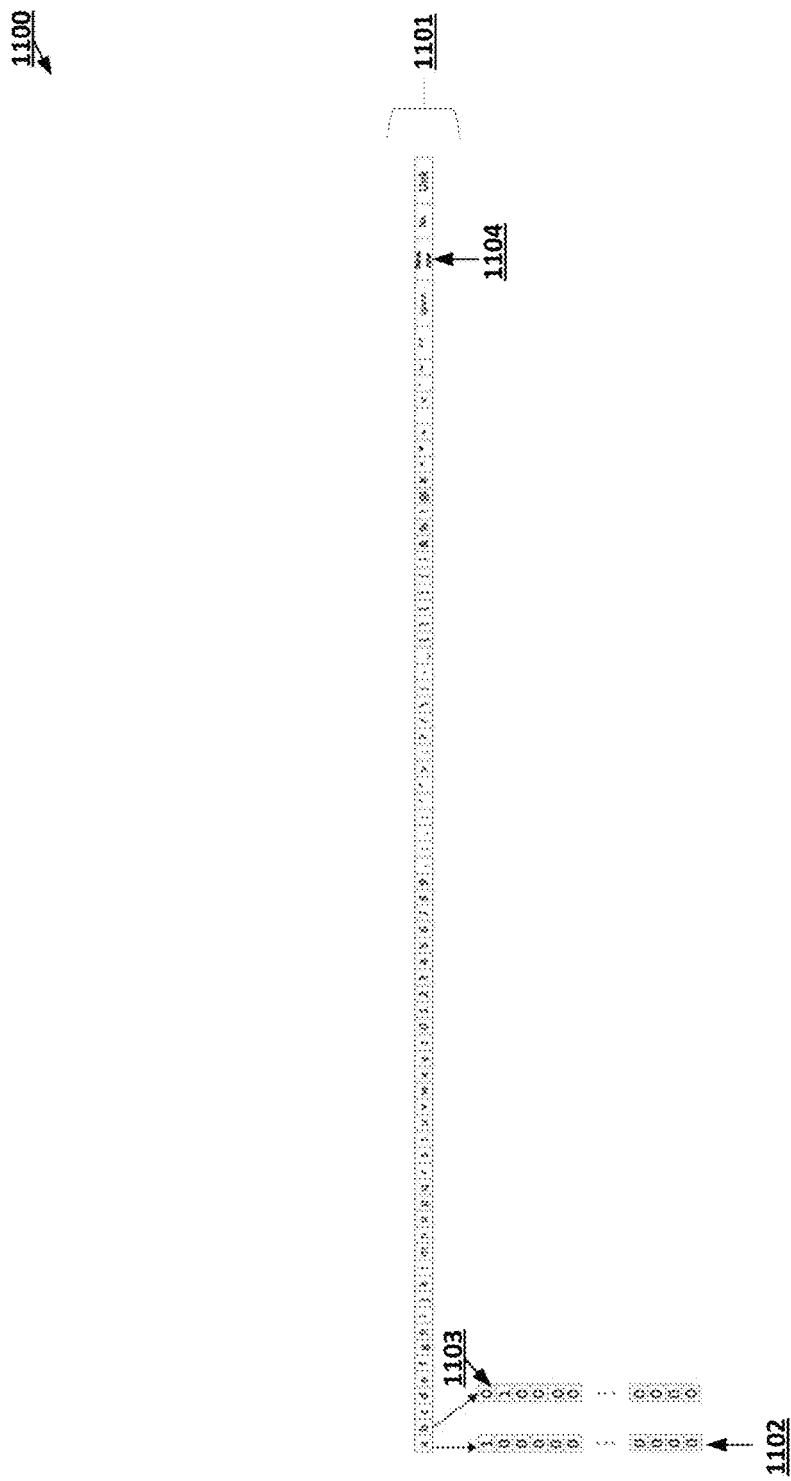

FIG. 11 provides an operational example of a one-hot-encoding scheme in accordance with some embodiments discussed herein.

Figure 12:
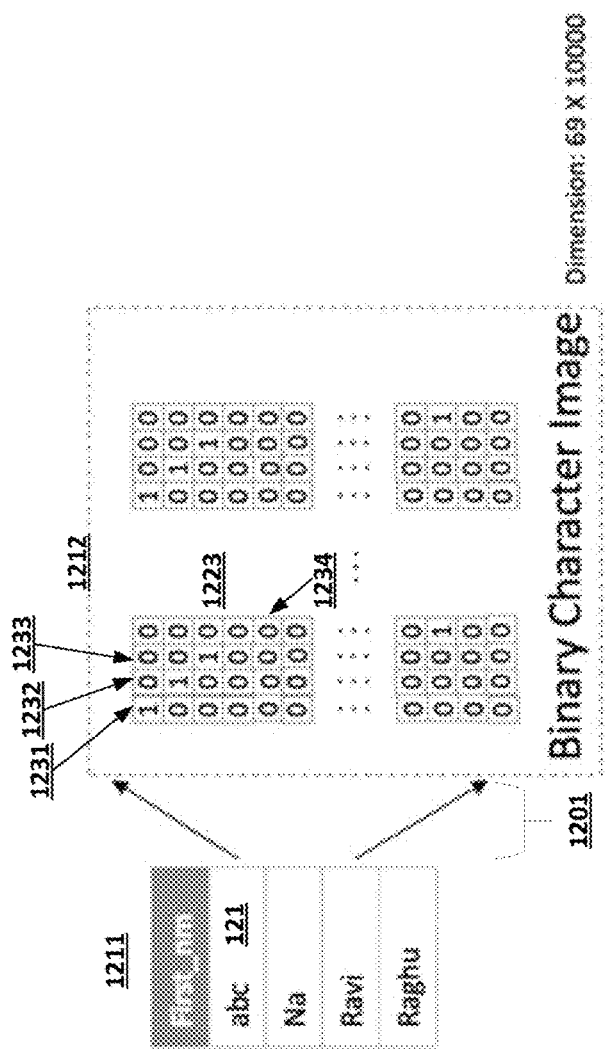

FIG. 12 provides an operational example of generating an image representation of an augmented data column based at least in part on per-character one-hot-encodings for the augmented data column in accordance with some embodiments discussed herein.

Figure 13A:
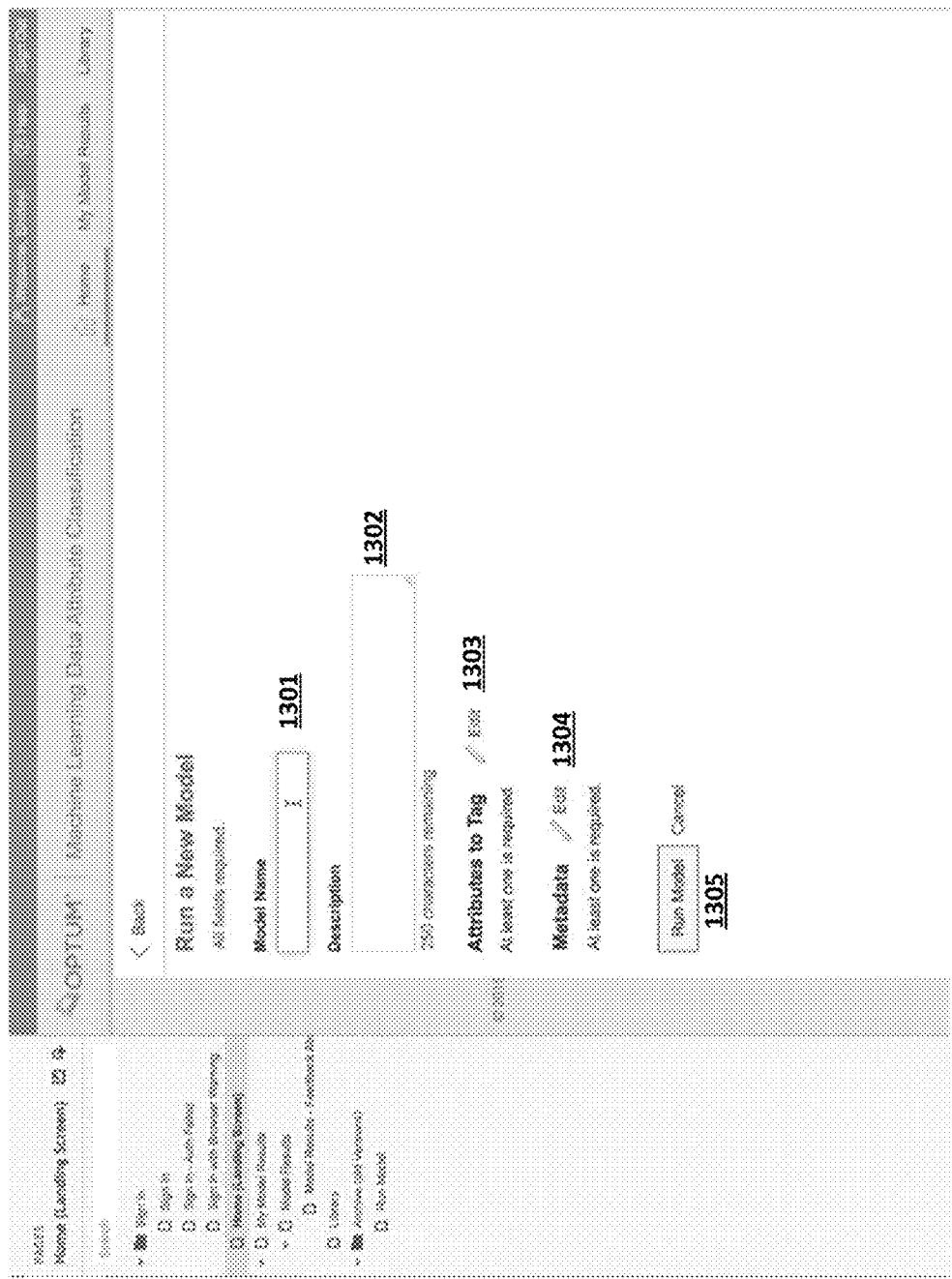
Figure 13B:
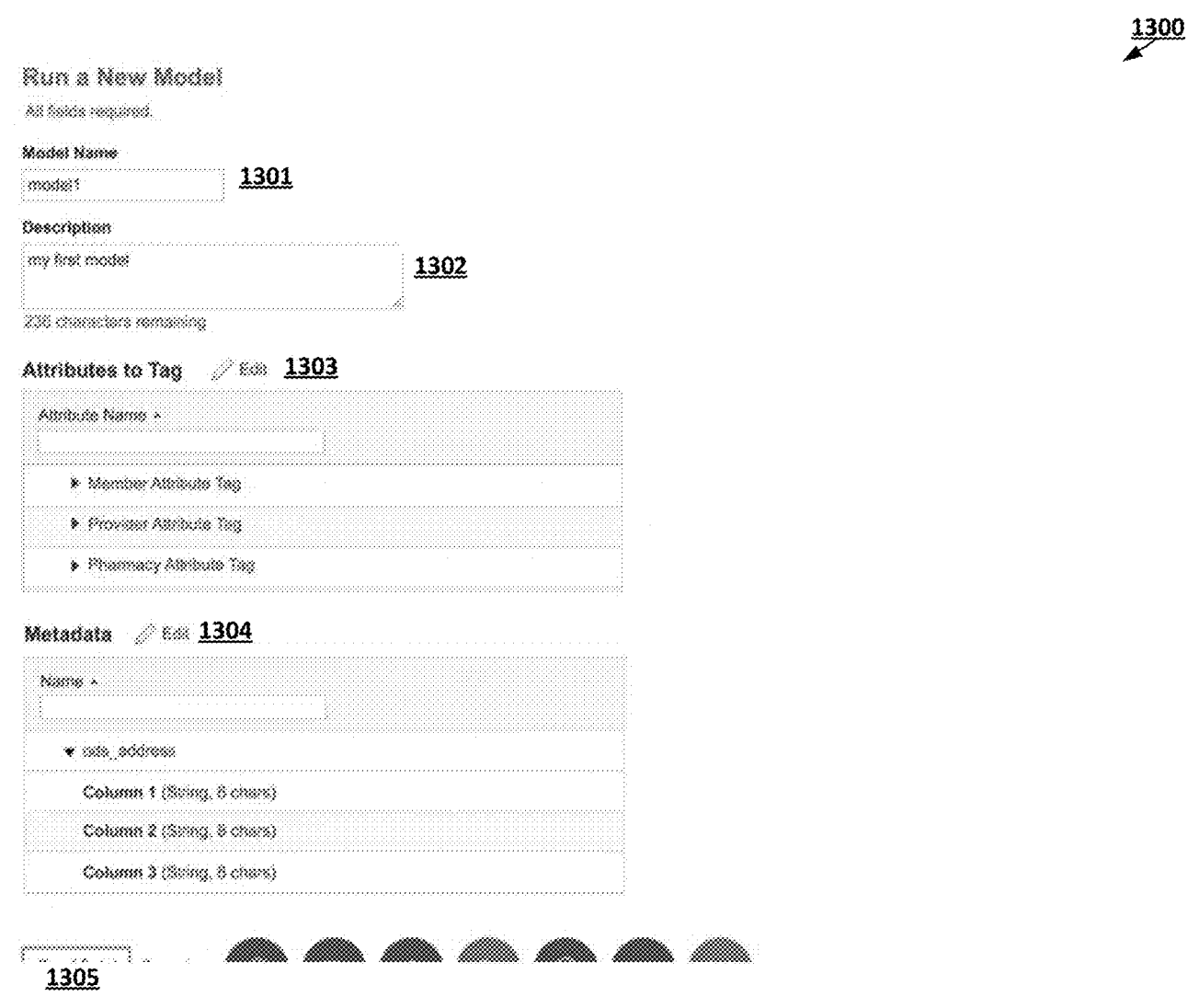

FIGS. 13A-13B provide operational examples of a column designation user interface in accordance with some embodiments discussed herein.

Figure 14A:
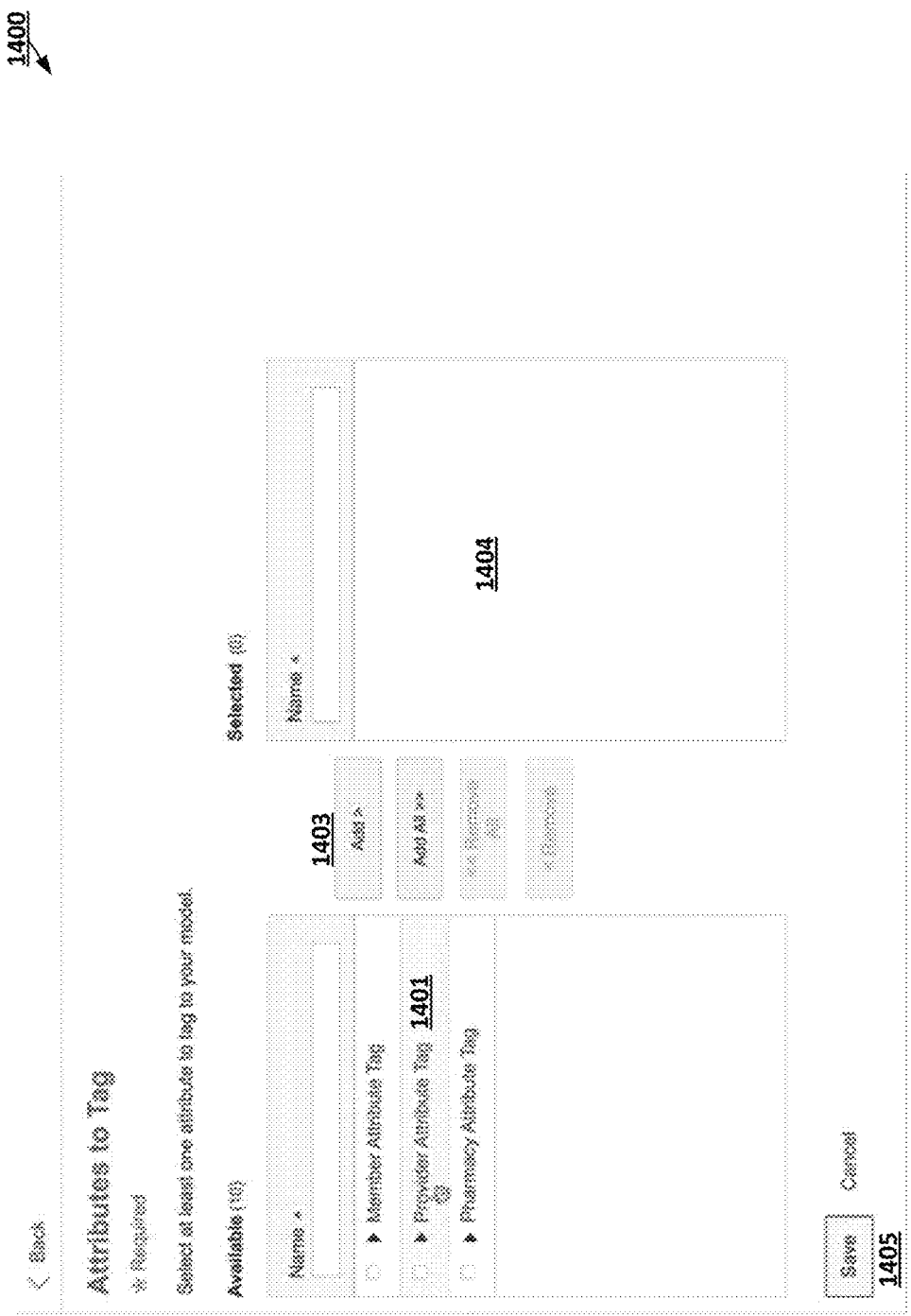
Figure 14B:
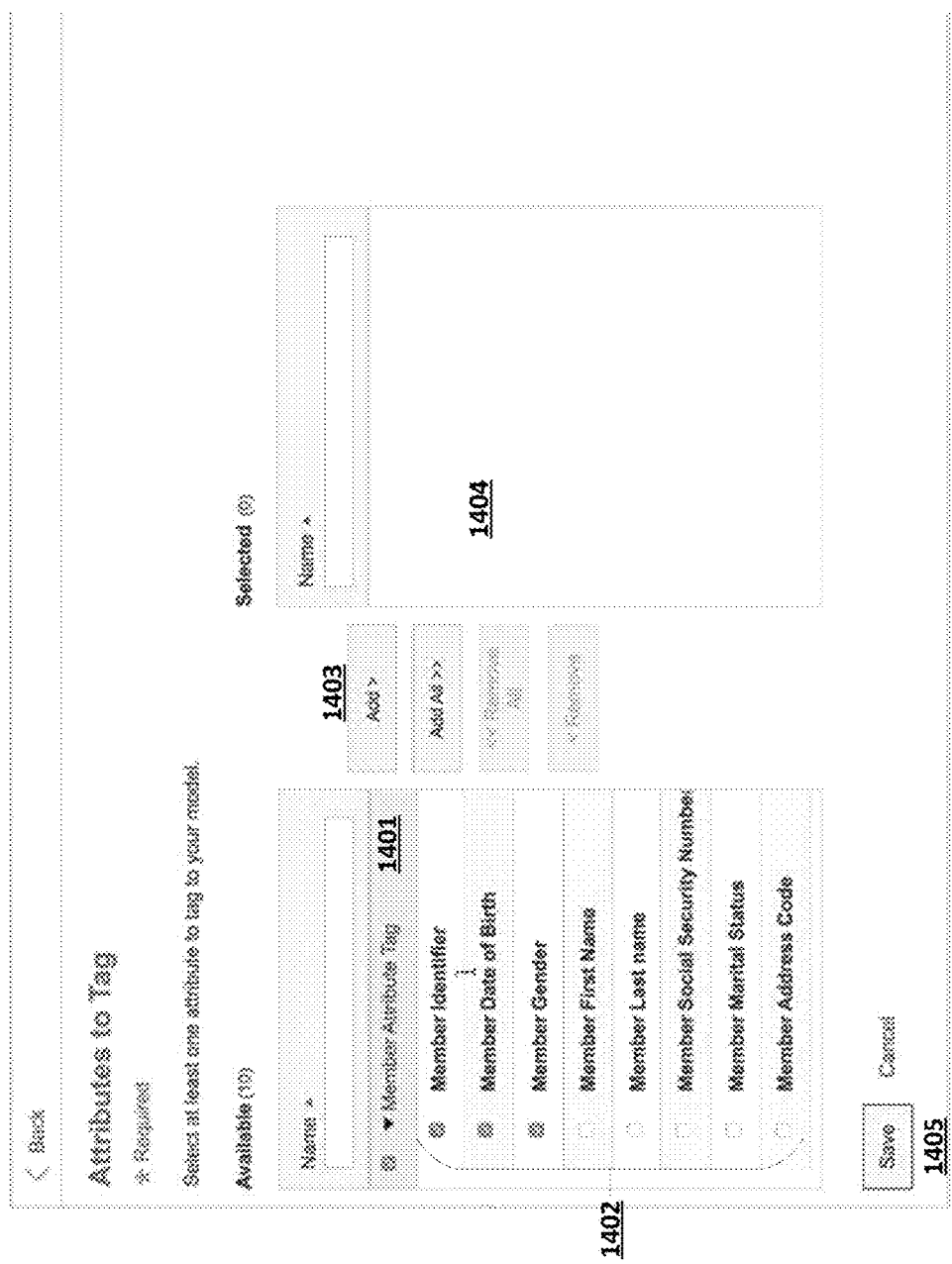

FIGS. 14A-14B provide operational examples of a tagged data column designation user interface in accordance with some embodiments discussed herein.

Figure 15A:
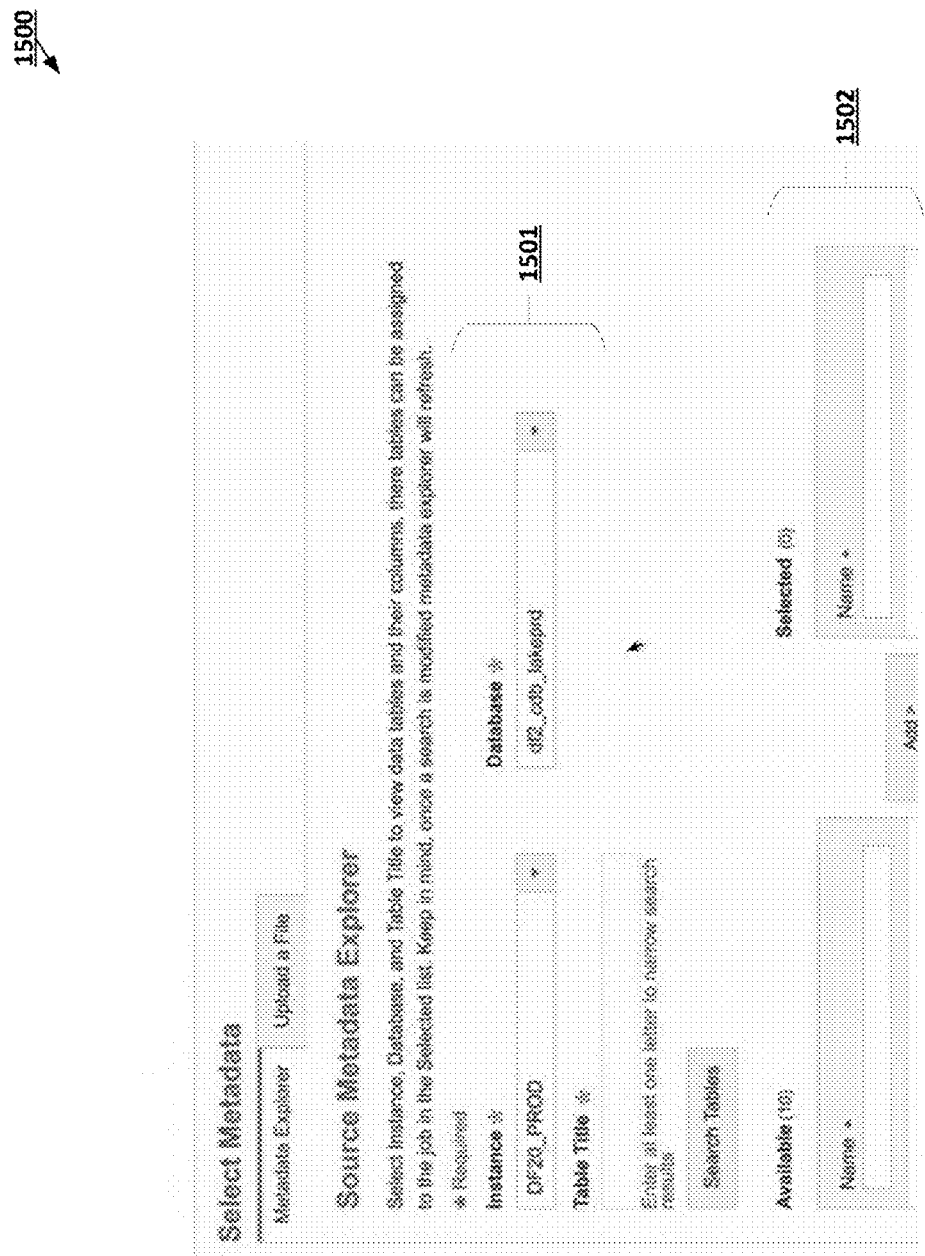
Figure 15B:
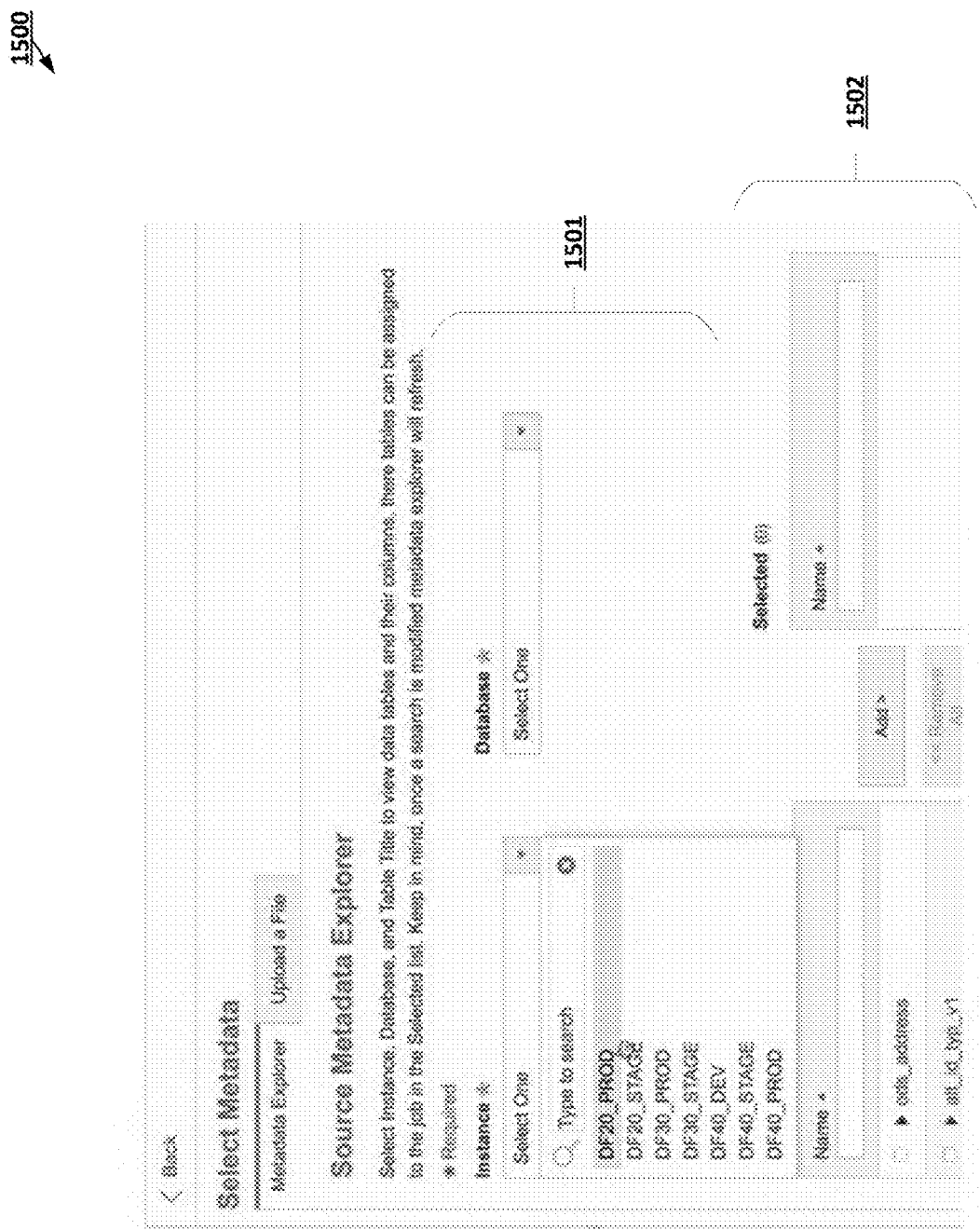

FIGS. 15A-15B provide operational examples of an untagged data column designation user interface in accordance with some embodiments discussed herein.

Figure 16:
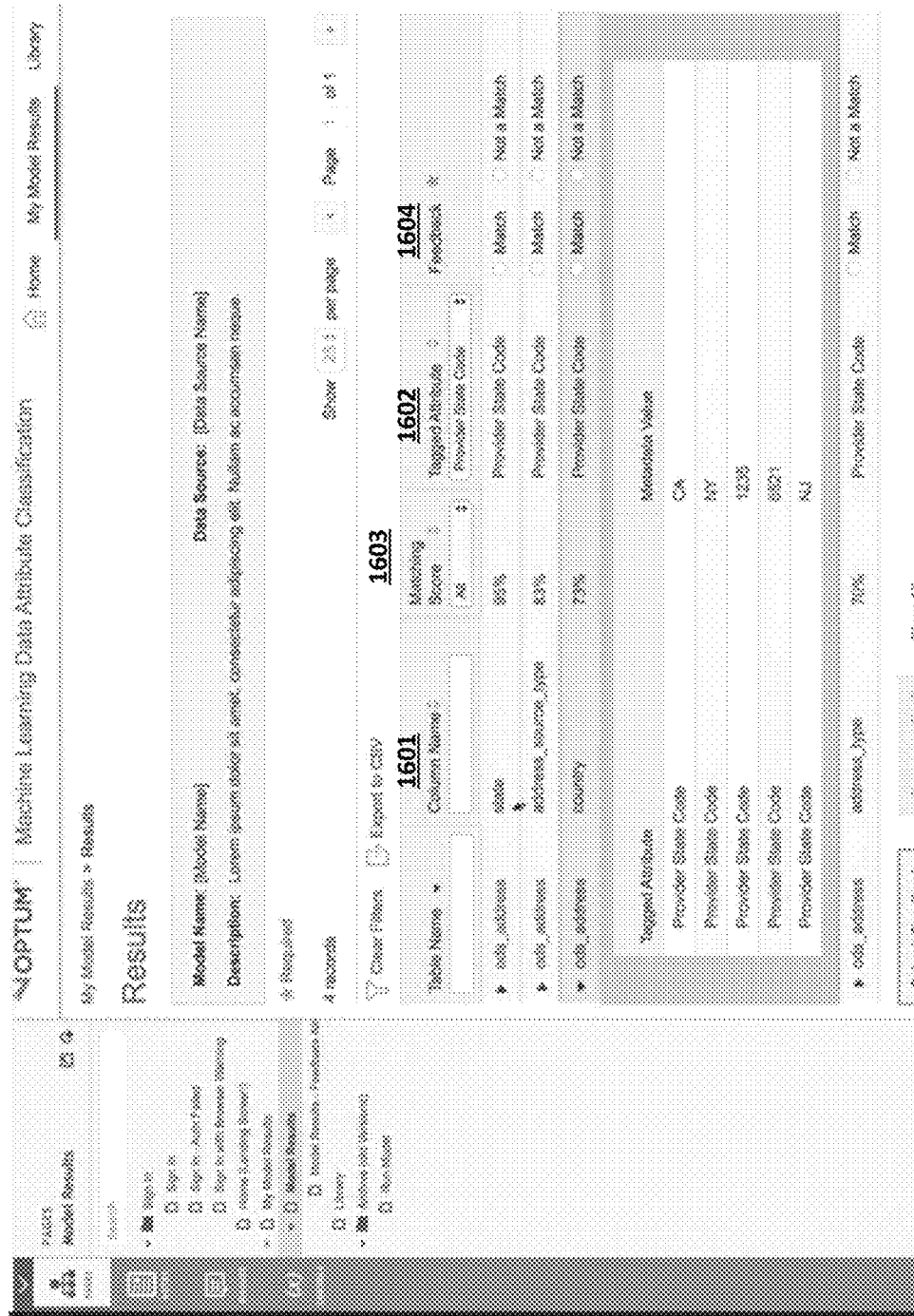

FIG. 16 provides operational examples of a cross-column relationship detection user interface in accordance with some embodiments discussed herein.

FIG. 17 provides an operational example of pseudocode for a feature-based similarity determination engine in accordance with some embodiments discussed herein.

DETAILED DESCRIPTION

Various embodiments of the present invention are described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present invention are described with reference to predictive data analysis, one of ordinary skill in the art will recognize that the disclosed concepts can be used to perform other types of data analysis.

I. OVERVIEW

Various embodiments of the present invention disclose techniques for more efficiently and reliably performing cross-data-column relationship detection across a group of data columns. For example, various embodiments of the present invention disclose techniques for performing cross-data-column relationship detection that utilize at least one of feature-based similarity models and deep-learning-based similarity models. The inventors have confirmed, via experiments and theoretical calculations, that various embodiments of the disclosed techniques improve efficiency and accuracy of cross-data-column relationship detection relative to various state-of-the-art solutions.

By facilitating efficient and reliable cross-data-column relationship detection, various embodiments of the present invention improve data retrieval efficiency as well as data storage efficiency of various data storage systems. Detecting relationships between data columns facilitates more efficient storage of such data columns, for example by enabling consolidation of related data columns across various databases and/or across various database tables. This in turn reduces storage needs of various existing data storage systems. Furthermore, detecting relationships between data columns enables faster and more reliable retrieval of data in response to data queries by utilizing cross-data-column relationship mapping data that can be generated using the outputs of cross-data-column relationship detection operations. This in turn increases the efficiency and reliability of data retrieval operations and/or data query processing operations across various data storage systems, such as various data storage systems that act as a server device in client-server data storage architectures.

Accordingly, by utilizing some or all of the innovative techniques disclosed herein for performing cross-data-column relationship detection across a group of data columns, various embodiments of the present invention increase efficiency and accuracy of data storage operations, data retrieval operations, and/or query processing operations across various data storage systems, such as various data storage systems that are part of client-server data storage architectures. In doing so, various embodiments of the present invention make substantial technical contributions to the field of database systems and substantially improve state-of-the-art data storage systems.

II. DEFINITIONS OF CERTAIN TERMS

The term "data column" may refer to a data object that describes a data attribute that may occur within a group of data fields. For example, a data column may describe a row as defined by a schema of a relational table that is generated in accordance with a relational data model. In some embodiments, each data field in the group of data fields is configured to have a value for each data attribute defined by a respective data column, where the value of a data field with respect to a particular data attribute may be a null value or a non-null value. A tagged data column may be a data object that describes a data column with existing relationships with other data columns, while an untagged data column may be a data object that describes a data column without existing relationships with other data columns. The existing relationships of a tagged data column may be determined using a process for detecting cross-column relationships among a plurality of input data columns and/or may be supplied as part of ground-truth data for a computing entity that is configured to perform a process for detecting cross-column relationships among a plurality of input data columns.

The term "related subset" for a data column may refer to a data object that describes one or more related data columns that are deemed related to the primary data column. In some embodiments, a data column may be associated with two or more related subsets, where each of the two or more related subsets for the data column are determined using a respective cross-column relationship detection model, such as using a feature-based similarity model or using a deep-learning-based similarity model. In some embodiments, a data column may be associated with a related subset that is determined using two or more cross-column relationship detection models, such as using a cross-column relationship detection technique that utilizes a combination of a feature-based similarity model and a deep-learning-based similarity model.

The term "feature-based similarity model" may refer to a data object that describes operations and/or parameters of a model that is configured to determine a related subset for an untagged data column from one or more tagged data columns based at least in part on one or more weighted similarity scores for each tagged data column with respect to the untagged data column, where the weighted similarity score for a tagged data column with respect to the untagged data column is determined based at least in part on one or more feature-based similarity measures for the tagged data column and the untagged data column. For example, the feature-based similarity model may describe operations and/or parameters of a model that is configured to determine a related subset for an untagged data column from one or more tagged data columns by performing at least some of the following operations: (i) determining, for each tagged data column of the one or more tagged data columns, one or more feature-based similarity measures, (ii) combining each of the one or more feature-based similarity measures for a tagged data column of the one or more tagged data columns in accordance with one or more similarity measure parameters to determine one or more weighted similarity scores for the tagged data column, and (iii) determining an initial related subset based at least in part on each one or more weighted similarity scores for a tagged data column of the one or more tagged data columns.

The term "feature-based similarity measure" may refer to a data object that describes a measure of similarity between a tagged data column and an untagged data column based at least in part on one or more selected feature values of the tagged data column (i.e., based at least in part on one or more selected tagged feature values associated with the feature-based similarity measure) and based at least in part on one or more feature values of the untagged data column (i.e., based at least in part on one or more selected untagged feature values associated with the feature-based similarity measure). For example, a feature-based similarity measure may describe a measure of similarity between a column name of the corresponding tagged data column associated with the feature-based similarity measure and a column name of the corresponding untagged data column. As another example, a feature-based similarity measure may describe a measure of similarity between numeric features of the corresponding tagged data column associated with the feature-based similarity measure and numeric features of the corresponding untagged data column associated with the feature-based similarity measure. As a further example, a feature-based similarity measure may describe a measure of similarity between all of the features of the corresponding tagged data column associated with the feature-based similarity measure and all of the features of the corresponding untagged data column associated with the feature-based similarity measure.

The term "weighted similarity score" may refer to a data object that describes a measure of weighted combination of a selected subset of feature-based similarity measures associated with a corresponding tagged data column and a corresponding untagged data column, where the selected subset includes two or more feature-based similarity measures of the feature-based similarity measures that are associated with the corresponding tagged data column and the corresponding untagged data column. For example, a particular weighted similarity score may describe a measure of weighted combination of a nominal feature-based similarity measure, a categorical feature-based similarity measure, a numeric feature-based similarity measure, and a probabilistic feature-based similarity measure. As another example, a particular weighted similarity score may describe a measure of weighted combination of a categorical feature-based similarity measure, a numeric feature-based similarity measure, and a probabilistic feature-based similarity measure. In some embodiments, the weight values applied to feature-based similarity measures in order to generate a weighted similarity score are determined using one or more trained parameters of a corresponding feature-based similarity model, e.g., one or more trained parameters determined using a gradient descent training algorithm that utilizes ground-truth data about existing relationships between tagged data columns in order to generate an optimized value for each weight value.

The term "nominal similarity measure" may refer to a feature-based similarity measure associated with two data columns that describes a measure of deviation/similarity between the nominal subset of the feature values for a first data column of the two data column and the nominal subset of the feature values for a second data column of the two data columns. For example, a nominal similarity measure may describe a measure of deviation between a nominal subset of the feature values for a tagged data column with respect to the nominal subset of the feature values for an untagged data column. In some embodiments, a nominal similarity measure for two data columns may describe a measure of cosine similarity between a TF-IDF vector of a first data column of the two data columns and a TF-IDF vector of a second data column of the two data columns, where the TF-IDF vector for a particular data column may be determined based at least in part on relative frequencies of substrings of particular sizes (e.g., substrings of a size equal to two words or three words and/or substrings of a size equal to two words or three characters) among all substrings of the column name of the two data column with respect to a corpus of sub string collection sets that includes the substring collection sets for the noted two data columns.

The term "categorical similarity measure" may refer to a feature-based similarity measure associated with two data columns that describes a measure of deviation between the categorical subset of the feature values for a first data column of the two data column and the categorical subset of the feature values for a second data column of the two data columns. For example, a categorical similarity measure may describe a measure of deviation between a categorical subset of the feature values for a tagged data column with respect to the categorical subset of the feature values for an untagged data column. In some embodiments, the categorical similarity measure for two data columns is determined based at least in part on a Sorensen—Dice distance measure (and/or any other distance metric that can calculate the distance between two categorical columns, such as the Dice distance) between the categorical subset of the feature values for a first data column of the two data column and the categorical subset of the feature values for a second data column of the two data columns.

The term "numeric similarity measure" may refer to a feature-based similarity measure associated with two data columns that describes a measure of deviation between the numeric subset of the feature values for a first data column of the two data column and the numeric subset of the feature values for a second data column of the two data columns. For example, a numeric similarity measure may describe a measure of deviation between a numeric subset of the feature values for a tagged data column with respect to the numeric subset of the feature values for an untagged data column. In some embodiments, the numeric similarity measure for two data columns is determined based at least in part on a Euclidean deviation measure between the numeric subset of the feature values for a first data column of the two data column and the numeric subset of the feature values for a second data column of the two data columns.

The term "holistic similarity measure" may refer to a feature-based similarity measure associated with two data columns that describes a measure of deviation between all of the feature values for a first data column of the two data column and all of the feature values for a second data column of the two data columns. For example, a holistic similarity measure may describe a measure of deviation between all of the feature values for a tagged data column with respect to all of the feature values for an untagged data column. In some embodiments, the holistic similarity measure for two data columns is determined based at least in part on a Gowers distance measure (and/or any other similarity/distance measures) between all of the feature values for a first data column of the two data column and all of the feature values for a second data column of the two data columns.

The term "probabilistic similarity measure" may refer to a feature-based similarity measure associated with two data columns that describes a probabilistic measure of deviation between the categorical subset of the feature values for a first data column of the two data column and the categorical subset of the feature values for a second data column of the two data columns. For example, a categorical similarity measure may describe a probabilistic measure of deviation between a categorical subset of the feature values for a tagged data column with respect to the categorical subset of the feature values for an untagged data column. In some embodiments, the categorical similarity measure for two data columns is determined based at least in part on a Jaccard distance measure between (i.e., a Jaccard index for) the categorical subset of the feature values for a first data column of the two data column and the categorical subset of the feature values for a second data column of the two data columns.

The term "name-inclusive weighted similarity" score may refer to a data object that describes a weighted combination of two or more feature-based similarity measures for two data columns, where the two or more feature-based similarity measures include a nominal similarity measure for the two data columns. For example, a name-inclusive weighted similarity score for a tagged data column may describe a weighted combination of two or more feature-based similarity measures for the tagged data column with respect to an untagged data column, where the two or more feature-based similarity measures include a nominal similarity measure for the tagged data column with respect to the untagged data column. In some embodiments, the name-inclusive weighted similarity score for two data columns may be determined based at least in part on a weighted combination of the nominal similarity measure for the two data columns, the categorical similarity measure for the two data columns, the numeric similarity measure for the two data columns, and the holistic similarity measure for the two data columns.

The term "name-exclusive weighted similarity score" may refer to a data object that describes a weighted combination of two or more feature-based similarity measures for two data columns, where the two or more feature-based similarity measures do not include a nominal similarity measure for the two data columns. For example, a name-exclusive weighted similarity score for a tagged data column may describe a weighted combination of two or more feature-based similarity measures for the tagged data column with respect to an untagged data column, where the two or more feature-based similarity measures do not include a nominal similarity measure for the tagged data column with respect to the untagged data column. In some embodiments, the name-exclusive weighted similarity score for two data columns may be determined based at least in part on a weighted combination of the categorical similarity measure for the two data columns, the numeric similarity measure for the two data columns, and the holistic similarity measure for the two data columns.

The term "augmented data column" for a corresponding non-augmented data column may refer to a data column that is associated with a set of values that includes the same set of data values as the non-augmented data column, but where the ordering of the set of data values in the augmented data column is different from the ordering of the corresponding non-augmented data column. For example, an augmented data column may be generated by randomly shuffling data values associated with a corresponding non-augmented data column. As another example, a computer system may generate multiple augmented data columns for each non-augmented data column by shuffling the data values of the non-augmented data column in accordance with one or more shuffling orders, where each shuffling order includes one or more value order replacements for the data values in the non-augmented data column. Thus, a first augmented data column may be associated with a shuffling order that requires moving each nth data value of the non-augmented data column to an n+1th position as well as moving the last value of the non-augmented data column to a first portion, a second augmented data column may be associated with a shuffling order that requires moving each odd-number-positioned data value of the augmented data column to the immediately succeeding even-numbered position and moving each even-number-positioned data value of the augmented data column to the immediately preceding odd-numbered position, a third augmented data column may be associated with a shuffling order that requires preserving the order of the non-augmented data column except making one or more specified value order replacements (e.g., moving the first value to the tenth position), and/or the like.

The term "image representation" for a corresponding data column may refer to a data object that describes an image, where at least some of the pixel values of the pixels associated with the noted image are determined based at least in part on a feature of the corresponding data column. For example, an image representation for an augmented data column may refer to a data object that describes an image having a group of pixel values, where each pixel value among the group of pixel values may be determined based at least in part on a numeric designation (e.g., a one-hot-encoding-based numeric designation) of a character associated with the data values for the augmented data column.

The term "deep-learning-based similarity model" may refer to a data object that describes parameters and/or operations of a machine learning model that is configured to detect cross-column relationships between a group of data columns based at least in part on processing image representations of the group of data columns using trained image processing models in order to generate vector representation of the group of data columns and based at least in part on comparing vector representations of the group of data columns. For example, a deep-learning-based similarity model may be configured to: (i) generate a plurality of augmented data columns comprising a plurality of tagged augmented data columns and a plurality of untagged data columns based at least in part on a plurality of input data columns, (ii) generate an image representation for each augmented data column of the plurality of augmented data columns, (iii) generate a vector representation for each augmented data column of the plurality of augmented data columns by processing the image representation associated with the augmented data column in accordance with one or more trained image processing models, and (iv) generate an updated related subset of the plurality of tagged augmented data columns based at least in part on each vector representation for an augmented data column of a subset of the plurality of augmented data columns that correspond to the untagged data columns.

The term "character designation" of a data column may refer to a data object that describes one or more of the following: (i) a character that appears in the column name of the data column and/or that appears in a data value associated with the data column, (ii) end of the column name of the data column, and (iii) end of a portion of the data values for the data column that relate to a particular data field. For example, if a data column includes the data values "Atlanta" for a first field, "Miami" for a second field, and "Boston" for a third field, the character designations for the data column may include "A," "T," "L," "A," "N," "T," "A," "End of Field" (EOF), "M," "I," "A," "M," "I," "EOF," "B," "O," "S," "T," "O," "N." As another example, if a data column named "City" includes the data values "Atlanta" for a first field, "Miami" for a second field, and "Boston" for a third field, the character designations for the data column may include "C," "I," "T," "Y," "EOF," "A," "T," "L," "A," "N," "T," "A," "EOF," "M," "I," "A," "M," "I," "EOF," "B," "O," "S," "T," "O," "N."

The term "one-hot-encoding scheme" may refer to a data object that defines, for each potential character designation of a group of potential character designations, a unique numeric designation that consists of a combination of zeros and ones. The per-character one-hot-encoding for a particular character designation is a data object that describes the unique numeric designation for the particular character designation as determined in accordance with a corresponding one-hot-encoding scheme. For example, as depicted in the one-hot-encoding scheme 1100 of FIG. 11, the character designation "a" is associated with the unique numeric designation 1102 while the character designation "b" is associated with the unique numeric designation 1103. While various embodiments of the present invention describe mapping character designations to numeric representations consisting of a combination of zeros of ones (i.e., having a selection range of zero and one), a person of ordinary skill in the relevant technology will recognize that character designations may be mapped to numeric representations having different selection ranges and/or to non-numeric representations, such as to symbolic representations associated with selection ranges that consists of non-numeric symbols.

The term "trained image processing model may refer to a data object that describes operations and/or parameters of a model having at least one trained parameter, where the model is configured to generate a vector representation of an image representation. An example of a trained image processing model is a convolutional neural network model, an autoencoder model (e.g., a regular autoencoder model, a variational autoencoder model, and/or the like) generated as part of an encoder-decoder architecture, a convolutional-network-based encoder model, and/or the like. In some embodiments, a computer system may utilize two or more image processing models each configured to generate a per-model vector representation, such as one-dimensional convolutional neural network autoencoder model and a two-dimensional convolutional neural network model. In some of the noted embodiments, the per-model vector representations for an image representation are combined to generate the vector representation for the image representation.

III. COMPUTER PROGRAM PRODUCTS, METHODS, AND COMPUTING ENTITIES

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatuses, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatuses, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

IV. EXEMPLARY SYSTEM ARCHITECTURE

FIG. 1 is a schematic diagram of an example architecture 100 for detecting cross-column relationships between a group of input data columns. The architecture 100 includes an attribute search framework system 101 configured to receive cross-column relationship detection requests from the client computing entities 102, process the cross-column relationship detection requests to generate query outputs, and provide the query outputs to the client computing entities 102. In some embodiments, attribute search framework system 101 may communicate with at least one of the client computing entities 102 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like).

The attribute search framework system 101 may include an attribute search framework computing entity 106 and a storage subsystem 108. The attribute search framework computing entity 106 may be configured to process the cross-column relationship detection requests to generate query outputs and provide the query outputs to the client computing entities 102. The storage subsystem 108 may be configured to store at least a portion of input data utilized by the attribute search framework computing entity 106 to perform automated cross-column relationship detection. The storage subsystem 108 may further be configured to store at least a portion of configuration data (e.g., model definition data) utilized by the attribute search framework computing entity 106 to perform automated cross-column relationship detection.

The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

Exemplary Attribute Search Framework Computing Entity

FIG. 2 provides a schematic of an attribute search framework computing entity 106 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the attribute search framework computing entity 106 may also include one or more communications interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the attribute search framework computing entity 106 may include or be in communication with one or more processing elements 205 (also referred to as processors, processing circuitry, and/or similar terms used herein interchangeably) that communicate with other elements within the attribute search framework computing entity 106 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the attribute search framework computing entity 106 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity—relationship model, object model, document model, semantic model, graph model, and/or the like.

In one embodiment, the attribute search framework computing entity 106 may further include or be in communication with volatile media (also referred to as volatile storage, memory, memory storage, memory circuitry and/or similar terms used herein interchangeably). In one embodiment, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the attribute search framework computing entity 106 with the assistance of the processing element 205 and operating system.

As indicated, in one embodiment, the attribute search framework computing entity 106 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the attribute search framework computing entity 106 may be configured to communicate via wireless client communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the attribute search framework computing entity 106 may include or be in communication with one or more input elements, such as a keyboard input, a mouse input, a touch screen/display input, motion input, movement input, audio input, pointing device input, joystick input, keypad input, and/or the like. The attribute search framework computing entity 106 may also include or be in communication with one or more output elements (not shown), such as audio output, video output, screen/display output, motion output, movement output, and/or the like.

Exemplary Client Computing Entity

FIG. 3 provides an illustrative schematic representative of a client computing entity 102 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Client computing entities 102 can be operated by various parties. As shown in FIG. 3, the client computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the client computing entity 102 may be capable of operating with one or more air interface standards, communication protocols, modulation types, and access types. More particularly, the client computing entity 102 may operate in accordance with any of a number of wireless communication standards and protocols, such as those described above with regard to the attribute search framework computing entity 106. In a particular embodiment, the client computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the client computing entity 102 may operate in accordance with multiple wired communication standards and protocols, such as those described above with regard to the attribute search framework computing entity 106 via a network interface 320.

Via these communication standards and protocols, the client computing entity 102 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The client computing entity 102 can also download changes, add-ons, and updates, for instance, to its firmware, software (e.g., including executable instructions, applications, program modules), and operating system.

According to one embodiment, the client computing entity 102 may include location determining aspects, devices, modules, functionalities, and/or similar words used herein interchangeably. For example, the client computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the client computing entity's 102 position in connection with a variety of other systems, including cellular towers, Wi-Fi access points, and/or the like. Similarly, the client computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The client computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the client computing entity 102 to interact with and/or cause display of information/data from the attribute search framework computing entity 106, as described herein. The user input interface can comprise any of a number of devices or interfaces allowing the client computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the client computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The client computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the client computing entity 102. As indicated, this may include a user application that is resident on the entity or accessible through a browser or other user interface for communicating with the attribute search framework computing entity 106 and/or various other computing entities.

In another embodiment, the client computing entity 102 may include one or more components or functionality that are the same or similar to those of the attribute search framework computing entity 106, as described in greater detail above. As will be recognized, these architectures and descriptions are provided for exemplary purposes only and are not limiting to the various embodiments.

In various embodiments, the client computing entity 102 may be embodied as an artificial intelligence (AI) computing entity, such as an Amazon Echo, Amazon Echo Dot, Amazon Show, Google Home, and/or the like. Accordingly, the client computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

V. EXEMPLARY SYSTEM OPERATIONS

Described herein are various techniques for detecting cross-column relationships among a plurality of input data columns. Some of the described techniques utilize a particular combination of a feature-based similarity model and a deep-learning-based similarity model in which the output of the feature-based similarity model is supplied as an input of the deep-learning-based similarity model. However, a person of ordinary skill in the art will recognize that detecting cross-column relationships among a plurality of input data columns may be performed using only one of the feature-based similarity model and the deep-learning-based similarity model. Moreover, a person of ordinary skill in the art will recognize that detecting cross-column relationships among a plurality of input data columns may be performed using other combinations of the feature-based similarity model and the deep-learning-based similarity model that are different from the particular combination in which the output of the feature-based similarity model is supplied as an input of the deep-learning-based similarity model. For example, in some embodiments, the output of the deep-learning-based similarity model may be provided as an input to the feature-based similarity model in order to detect cross-column relationships among a plurality of input data columns. As another example, the output of the feature-based similarity model may be provided as an input to one or more other similarity models and the output of the other similarity models may be provided as an input to the deep-learning-based similarity model in order to detect cross-column relationships among a plurality of input data columns based on the output of the deep-learning-based similarity model.

As a further example, the output of the deep-learning-based similarity model may be provided as an input to one or more other similarity models and the output of the other similarity models may be provided as an input to the feature-based similarity model in order to detect cross-column relationships among a plurality of input data columns based on the output of the feature-based similarity model.

By facilitating efficient and reliable cross-data-column relationship detection, various embodiments of the present invention improve data retrieval efficiency as well as data storage efficiency of various data storage systems. Detecting relationships between data columns facilitates more efficient storage of such data columns, for example by enabling consolidation of related data columns across various databases and/or across various database tables. This in turn reduces storage needs of various existing data storage systems. Furthermore, detecting relationships between data columns enables faster and more reliable retrieval of data in response to data queries by utilizing cross-data-column relationship mapping data that can be generated using the outputs of cross-data-column relationship detection operations. This in turn increases the efficiency and reliability of data retrieval operations and/or data query processing operations across various data storage systems, such as various data storage systems that act as a server devices in client-server data storage architectures.

FIG. 4 is a flowchart diagram of an example process 400 for detecting cross-column relationships among a plurality of input data columns including an untagged data column and one or more tagged data columns. Via the various steps/operations of the process 400, the attribute search framework computing entity 106 can efficiently and reliably detect tagged data columns that relate to each untagged data column, as well as determine a relationship score for each relationship between a tagged data column and an untagged data column.

Feature-Based Similarity Models

The process 400 begins at step/operation 401 when the attribute search framework computing entity 106 processes the plurality of input data columns using a feature-based similarity model to determine an initial related subset of the one or more tagged data columns for the untagged data column. In some embodiments, the feature-based similarity model is configured to: (i) determine, for each tagged data column of the one or more tagged data columns, one or more feature-based similarity measures, (ii) combine each of the one or more feature-based similarity measures for a tagged data column of the one or more tagged data columns in accordance with one or more similarity measure parameters to determine one or more weighted similarity scores for the tagged data column, and (iii) determine an initial related subset based at least in part on each one or more weighted similarity scores for a tagged data column of the one or more tagged data columns.

A data column may refer to a data object that describes a data attribute that may occur within a group of data fields. For example, a data column may describe a row as defined by a schema of a relational table that is generated in accordance with a relational data model. In some embodiments, each data field in the group of data fields is configured to have a value for each data attribute defined by a respective data column, where the value of a data field with respect to a particular data attribute may be a null value or a non-null value. A tagged data column may be a data object that describes a data column with existing relationships with other data columns, while an untagged data column may be a data object that describes a data column without existing relationships with other data columns. The existing relationships of a tagged data column may be determined using a process for detecting cross-column relationships among a plurality of input data columns and/or may be supplied as part of ground-truth data for a computing entity that is configured to perform a process for detecting cross-column relationships among a plurality of input data columns.

A related subset for a data column may refer to a data object that describes one or more related data columns that are deemed related to the primary data column. In some embodiments, a data column may be associated with two or more related subsets, where each of the two or more related subsets for the data column are determined using a respective cross-column relationship detection model, such as using a feature-based similarity model or using a deep-learning-based similarity model. In some embodiments, a data column may be associated with a related subset that is determined using two or more cross-column relationship detection models, such as using a cross-column relationship detection technique that utilizes a combination of a feature-based similarity model and a deep-learning-based similarity model.

A feature-based similarity model may refer to a data object that describes operations and/or parameters of a model that is configured to determine a related subset for an untagged data column from one or more tagged data columns based at least in part on one or more weighted similarity scores for each tagged data column with respect to the untagged data column, where the weighted similarity score for a tagged data column with respect to the untagged data column is determined at least in part based at least in part on one or more feature-based similarity measures for the tagged data column and the untagged data column. For example, the feature-based similarity model may describe operations and/or parameters of a model that is configured to determine a related subset for an untagged data column from one or more tagged data columns by performing at least some of the following operations: (i) determining, for each tagged data column of the one or more tagged data columns, one or more feature-based similarity measures, (ii) combining each of the one or more feature-based similarity measures for a tagged data column of the one or more tagged data columns in accordance with one or more similarity measure parameters to determine one or more weighted similarity scores for the tagged data column, and (iii) determining an initial related subset based at least in part on each one or more weighted similarity scores for a tagged data column of the one or more tagged data columns.

A feature-based similarity measure is a data object that describes a measure of similarity between a tagged data column and an untagged data column based at least in part on one or more selected feature values of the tagged data column (i.e., based at least in part on one or more selected tagged feature values associated with the feature-based similarity measure) and based at least in part on one or more feature values of the untagged data column (i.e., based at least in part on one or more selected untagged feature values associated with the feature-based similarity measure). For example, a feature-based similarity measure may describe a measure of similarity between a column name of the corresponding tagged data column associated with the feature-based similarity measure and a column name of the corresponding untagged data column. As another example, a feature-based similarity measure may describe a measure of similarity between numeric features of the corresponding tagged data column associated with the feature-based similarity measure and numeric features of the corresponding untagged data column associated with the feature-based similarity measure. As a further example, a feature-based similarity measure may describe a measure of similarity between all of the features of the corresponding tagged data column associated with the feature-based similarity measure and all of the features of the corresponding untagged data column associated with the feature-based similarity measure.

A weighted similarity score is a data object that describes a measure of weighted combination of a selected subset of feature-based similarity measures associated with a corresponding tagged data column and a corresponding untagged data column, where the selected subset includes two or more feature-based similarity measures of the feature-based similarity measures that are associated with the corresponding tagged data column and the corresponding untagged data column. For example, a particular weighted similarity score may describe a measure of weighted combination of a nominal feature-based similarity measure, a categorical feature-based similarity measure, a numeric feature-based similarity measure, and a probabilistic feature-based similarity measure. As another example, a particular weighted similarity score may describe a measure of weighted combination of a categorical feature-based similarity measure, a numeric feature-based similarity measure, and a probabilistic feature-based similarity measure. In some embodiments, the weight values applied to feature-based similarity measures in order to generate a weighted similarity score are determined using one or more trained parameters of a corresponding feature-based similarity model, e.g., one or more trained parameters determined using a gradient descent training algorithm that utilizes ground-truth data about existing relationships between tagged data columns in order to generate an optimized value for each weight value.

In some embodiments, step/operation 401 may be performed in accordance with the process depicted in FIG. 5. As depicted in FIG. 5, a feature engineering engine 501 of the attribute search framework computing entity 106 processes the untagged data column 511 to generate one or more untagged feature values 513 for the untagged data column 511. Moreover, the feature engineering engine 501 processes the one or more tagged data columns 512 to generate one or more tagged feature values 514 for each tagged data column of the one or more tagged data columns 512. In some embodiments, each feature value for a data column (e.g., for the untagged data column 511 or for one of the tagged data columns 512) describes one or more of a name of the data column, a distribution of data values corresponding to the data column, a description of contents of categorical data values corresponding to the data column, and one or more statistical features of data values corresponding to the data column. Examples of feature values determined for a data column include feature values in a nominal subset of the feature values for the data column, feature values in a categorical subset of the feature values for the data column, and feature values in a numeric subset of the feature values for the data column.

The nominal subset of the feature values for a corresponding data column may refer to a data object that describes a portion of the feature values for the corresponding data column that describe at least one attribute of a column name of the corresponding data column. For example, the nominal subset of the feature values for the corresponding data column may include a feature value that consists of the column name of the corresponding data column. As another example, the nominal subset of the feature values for the corresponding data column may describe feature values that describe frequency values of one or more terms that appear in the column name for the corresponding data column. As yet another example, the nominal subset of the feature values for the corresponding data column may describe one or more term-frequency-inverse-document-frequency (TF-IDF) values of one or more terms or characters that appear in the column name for the corresponding data column.

The categorical subset of the feature values for a corresponding data column may refer to a data object that describes a portion of the feature values for the corresponding data column that include categorical feature values. For example, the categorical subset of the feature values for the corresponding data column may include a feature value that describes whether a number of null values within the data values for the corresponding data column exceeds a null value threshold. As another example, the categorical subset of the feature values for the corresponding data column that is configured to record categorical data values may include a feature value that describes a most recurring categorical data value among the recorded categorical data values associated with the corresponding data column.

The numeric subset of the feature values for a corresponding data column may refer to a data object that describes a portion of the feature values for the corresponding data column that include numeric feature values. For example, the numeric subset of the feature values for the corresponding data column may include a feature value that describes a number of null values within the data values for the corresponding data column exceeds a null value threshold. As another example, the numeric subset of the feature values for the corresponding data column that is configured to record numeric data values may include a feature value that describes a most recurring categorical data value among the recorded numeric data values associated with the corresponding data column. As yet another example, the numeric subset of the feature values for the corresponding data column that is configured to record numeric data values may include a feature value that describes a measure of statistical distribution (e.g., a mean, a median, a mode, and/or the like) of the recorded numeric data values associated with the corresponding data column.

An operational example of performing the steps/operations that are performed by the feature engineering engine 501 is depicted in FIG. 6. As depicted in FIG. 6, a feature engineering routine 601 associated with the feature engineering engine 501 is configured to process the untagged data column 511 to generate forty untagged feature values 513 for the untagged data column 511. As further depicted in FIG. 6, the feature engineering routine 601 is further configured to process three tagged data columns 512 in order to generate forty tagged feature values 514 for each tagged data column among the three tagged data columns 512.

Returning to FIG. 5, the feature engineering engine 501 is configured to provide the untagged feature values 513 and the tagged feature values 514 (which include one or more per-tagged-data-column feature values for each tagged data column of the one or more tagged data columns 512) to the similarity measure determination engine 502 of the attribute search framework computing entity 106, which is in turn configured to generate five feature-based similarity measures for each tagged data column of the one or more tagged data columns 512: a nominal similarity measure 515, a categorical similarity measure 516, a numeric similarity measure 517, a holistic similarity measure 518, and a probabilistic similarity measure 519.

A nominal similarity measure is a feature-based similarity measure associated with two data columns that describes a measure of deviation between the nominal subset of the feature values for a first data column of the two data column and the nominal subset of the feature values for a second data column of the two data columns. For example, a nominal similarity measure may describe a measure of deviation between a nominal subset of the feature values for a tagged data column with respect to the nominal subset of the feature values for an untagged data column. In some embodiments, a nominal similarity measure for two data columns may describe a measure of cosine similarity between a TF-IDF vector of a first data column of the two data columns and a TF-IDF vector of a second data column of the two data columns, where the TF-IDF vector for a particular data column may be determined based at least in part on relative frequencies of substrings of particular sizes (e.g., substrings of a size equal to two words or three words and/or two or three characters) among all substrings of the column name of the two data column with respect to a corpus of substring collection sets that includes the substring collection sets for the noted two data columns. In some embodiments, the similarity measure determination engine 502 determines the nominal similarity measure 515 for a tagged data column of the one or more tagged data columns 512 based at least in part on a tagged nominal subset of the one or more tagged feature values for the tagged data column and an untagged nominal subset of the one or more untagged feature values for the untagged data column 511. In some of the noted embodiments, the nominal similarity measure for a tagged data column of the one or more tagged data column is determined based at least in part on determining a cosine similarity measure of a first TF-IDF vector of the tagged nominal subset and a second TF-IDF vector of the untagged nominal subset.

A categorical similarity measure is a feature-based similarity measure associated with two data columns that describes a measure of deviation between the categorical subset of the feature values for a first data column of the two data column and the categorical subset of the feature values for a second data column of the two data columns. For example, a categorical similarity measure may describe a measure of deviation between a categorical subset of the feature values for a tagged data column with respect to the categorical subset of the feature values for an untagged data column. In some embodiments, the categorical similarity measure for two data columns is determined based at least in part on a Sorensen—Dice distance measure between the categorical subset of the feature values for a first data column of the two data column and the categorical subset of the feature values for a second data column of the two data columns. In some embodiments, the similarity measure determination engine 502 determines the categorical similarity measure 516 for a tagged data column of the one or more tagged data columns 512 based at least in part on a tagged categorical subset of the one or more tagged feature values for the tagged data column and an untagged categorical subset of the one or more untagged feature values for the untagged data column 511. In some of the noted embodiments, the categorical similarity measure for a tagged data column of the one or more tagged data column is determined based at least in part on a Sorensen—Dice coefficient for the tagged categorical subset associated with the tagged data column and the untagged categorical subset.

A numeric similarity measure is a feature-based similarity measure associated with two data columns that describes a measure of deviation between the numeric subset of the feature values for a first data column of the two data column and the numeric subset of the feature values for a second data column of the two data columns. For example, a numeric similarity measure may describe a measure of deviation between a numeric subset of the feature values for a tagged data column with respect to the numeric subset of the feature values for an untagged data column. In some embodiments, the numeric similarity measure for two data columns is determined based at least in part on a Euclidean distance measure between the numeric subset of the feature values for a first data column of the two data column and the numeric subset of the feature values for a second data column of the two data columns. In some embodiments, the similarity measure determination engine 502 determines the numeric similarity measure 517 for a tagged data column of the one or more tagged data columns 512 based at least in part on a tagged numeric subset of the one or more tagged feature values for the tagged data column and an untagged numeric subset of the one or more untagged feature values for the untagged data column 511. In some of the noted embodiments, the numeric similarity measure for a tagged data column of the one or more tagged data column is determined based at least in part on a Euclidean deviation measure for the tagged numeric subset associated with the tagged data column and the untagged numeric subset.

A holistic similarity measure is a feature-based similarity measure associated with two data columns that describes a measure of deviation between all of the feature values for a first data column of the two data column and all of the feature values for a second data column of the two data columns. For example, a holistic similarity measure may describe a measure of deviation between all of the feature values for a tagged data column with respect to all of the feature values for an untagged data column. In some embodiments, the holistic similarity measure for two data columns is determined based at least in part on a Gowers distance measure between all of the feature values for a first data column of the two data column and all of the feature values for a second data column of the two data columns. In some embodiments, the similarity measure determination engine 502 determines the holistic similarity measure 518 for a tagged data column of the one or more tagged data columns 512 based at least in part on all of the one or more tagged feature values for the tagged data column and all of the one or more untagged feature values for the untagged data column 511. In some of the noted embodiments, the holistic similarity measure for a tagged data column of the one or more tagged data columns is determined based at least in part on a Gowers similarity measure for all of the feature values associated with the tagged data column and all of the feature values associated with the untagged data column.

A probabilistic similarity measure is a feature-based similarity measure associated with two data columns that describes a probabilistic measure of deviation between the categorical subset of the feature values for a first data column of the two data column and the categorical subset of the feature values for a second data column of the two data columns. For example, a probabilistic similarity measure may describe a probabilistic measure of deviation between a categorical subset of the feature values for a tagged data column with respect to the categorical subset of the feature values for an untagged data column. In some embodiments, the probabilistic similarity measure for two data columns is determined based at least in part on a Jaccard distance measure between (i.e., a Jaccard index for) the categorical subset of the feature values for a first data column of the two data column and the categorical subset of the feature values for a second data column of the two data columns. In some embodiments, the similarity measure determination engine 502 determines the probabilistic similarity measure 519 for a tagged data column of the one or more tagged data columns 512 based at least in part on a tagged categorical subset of the one or more tagged feature values for the tagged data column and an untagged categorical subset of the one or more untagged feature values for the untagged data column 511. In some of the noted embodiments, the probabilistic similarity measure for a tagged data column of the one or more tagged data column is determined based at least in part on a Jaccard similarity measure for the tagged categorical subset associated with the tagged data column and the untagged categorical subset.

After generating the nominal similarity measures 515, the categorical similarity measures 516, the numeric similarity measures 517, the holistic similarity measures 518, and the probabilistic similarity measures 519, the similarity measure determination engine 502 provides the noted feature-based similarity measures to a weighted similarity score determination engine 503 of the attribute search framework computing entity 106, which utilizes the received noted feature-based similarity measures to generate two weighted similarity scores for each tagged data column of the one or more tagged data columns 512: a name-inclusive weighted similarity score 520 and a name-exclusive weighted similarity score 521.

A name-inclusive weighted similarity score may be a data object that describes a weighted combination of two or more feature-based similarity measures for two data columns, where the two or more feature-based similarity measures include a nominal similarity measure for the two data columns. For example, a name-inclusive weighted similarity score for a tagged data column may describe a weighted combination of two or more feature-based similarity measures for the tagged data column with respect to an untagged data column, where the two or more feature-based similarity measures include a nominal similarity measure for the tagged data column with respect to the untagged data column. In some embodiments, the name-inclusive weighted similarity score for two data columns may be determined based at least in part on a weighted combination of the nominal similarity measure for the two data columns, the categorical similarity measure for the two data columns, the numeric similarity measure for the two data columns, and the holistic similarity measure for the two data columns.

In some embodiments, the weighted similarity score determination engine 503 determines the name-inclusive weighted similarity score 520 for a corresponding tagged data column of the one or more tagged data columns 512 based on: (i) the nominal similarity measure for the tagged data column, (ii) the categorical similarity measure for the tagged data column, (iii) the numeric similarity measure for the tagged data column, (iv) the holistic similarity measure for the tagged data column, (v) a nominal similarity measure weight value of the one or more similarity measure weight values for the nominal similarity measure, (vi) a name-inclusive categorical similarity measure weight value of one or more similarity measure weight values for the categorical similarity measure, (vii) a name-inclusive numeric similarity measure weight value of the one or more similarity measure weight values for the numeric similarity measure, and (viii) a name-inclusive holistic similarity measure weight value of the one or more similarity measure weight values for the holistic similarity measure. In some embodiments, the weighted similarity score determination engine 503 determines the name-inclusive weighted similarity score 520 for a corresponding tagged data column of the one or more tagged data columns 512 based at least in part on determining the sum of the following terms: (i) the product of the nominal similarity measure for the tagged data column and the nominal similarity measure weight value, (ii) the product of the categorical similarity measure for the tagged data column and the name-inclusive categorical similarity measure weight value, (iii) the product of the numeric similarity measure for the tagged data column and the name-inclusive numeric similarity measure weight value, and (iv) the product of the holistic similarity measure for the tagged data column and the name-inclusive holistic similarity measure weight value.

In some embodiments, determining the name-inclusive weighted similarity score 520 for a tagged data column includes performing the operations described by the below equation:

$$S_{nm} = S_1 * \alpha_1 + S_2 * \alpha_2 + S_3 * \alpha_3 + S_4 * \alpha_4, \qquad \text{Equation 1}$$

In Equation 1:
- $S_{nm}$ is the name-inclusive weighted-similarity score for the tagged data column,
- $S_1$ is the nominal similarity measure for the tagged data column,
- $S_2$ is the categorical similarity measure for the tagged data column,
- $S_3$ is the numeric similarity measure for the tagged data column,
- $S_4$ is the holistic similarity measure for the tagged data column,
- $\alpha_1$ is the nominal weight value for the nominal similarity measure $S_1$,
- $\alpha_2$ is the name-inclusive categorical weight value for the categorical similarity measure $S_2$,
- $\alpha_3$ is the name-inclusive numeric weight value for the numeric similarity measure $S_3$, and
- $\alpha_4$ is the name-inclusive holistic weight value for the holistic similarity measure $S_4$.

A name-exclusive weighted similarity score may be a data object that describes a weighted combination of two or more feature-based similarity measures for two data columns, where the two or more feature-based similarity measures do not include a nominal similarity measure for the two data columns. For example, a name-exclusive weighted similarity score for a tagged data column may describe a weighted combination of two or more feature-based similarity measures for the tagged data column with respect to an untagged data column, where the two or more feature-based similarity measures do not include a nominal similarity measure for the tagged data column with respect to the untagged data column. In some embodiments, the name-exclusive weighted similarity score for two data columns may be determined based at least in part on a weighted combination of the categorical similarity measure for the two data columns, the numeric similarity measure for the two data columns, and the holistic similarity measure for the two data columns.

In some embodiments, the weighted similarity score determination engine 503 determines the name-exclusive weighted similarity score 521 for a corresponding tagged data column of the one or more tagged data columns 512 based on: (i) the categorical similarity measure, (ii) the numeric similarity measure, (iii) the holistic similarity measure, (iv) a name-exclusive categorical similarity measure weight value of the one or more similarity measure weight values for the categorical similarity measure, (v) a name-exclusive numeric similarity measure weight value of the one or more similarity measure weight values for the numeric similarity measure, and (vi) a name-exclusive holistic similarity measure weight value of the one or more similarity measure weight values for the holistic similarity measure. In some embodiments, the weighted similarity score determination engine 503 determines the name-exclusive weighted similarity score 521 for a corresponding tagged data column of the one or more tagged data columns 512 based at least in part on determining the sum of the following terms: (i) the product of the categorical similarity measure for the tagged data column and the name-exclusive categorical similarity measure weight value, (ii) the product of the numeric similarity measure for the tagged data column and the name-exclusive numeric similarity measure weight value, and (iii) the product of the holistic similarity measure for the tagged data column and the name-exclusive holistic similarity measure weight value.

In some embodiments, determining the name-inclusive weighted similarity score 520 for a tagged data column includes performing the operations described by the below equation:

$$S_{nm}=(S_2*\beta_2+S_3*\beta_3+S_4*\beta_4)|\beta_1=0 \qquad \text{Equation 2}$$

In Equation 2:

$S_{nm}$ is the name-exclusive weighted-similarity score for the tagged data column, $S_2$ is the categorical similarity measure for the tagged data column, $S_3$ is the numeric similarity measure for the tagged data column, $S_4$ is the holistic similarity measure for the tagged data column, $\beta_2$ is the name-exclusive categorical weight value for the categorical similarity measure $S_2$, $\beta_3$ is the name-exclusive numeric weight value for the numeric similarity measure $S_3$, and $\beta_4$ is the name-exclusive holistic weight value for the holistic similarity measure $S_4$.

An operational example of performing the steps/operations performed by the weighted similarity score determination engine 503 is depicted in FIG. 7. As depicted in FIG. 7, the weighted similarity score determination engine 503 performs two routines: a name-inclusive weighted score determination routine 701 and a name-exclusive weighted score determination routine 702. The name-inclusive weighted score determination routine 701 is configured to process the nominal similarity measure 515 for a tagged data column of the one or more tagged data columns 512 with respect to the untagged data column 511, the categorical similarity measure 516 for the tagged data column 512 with respect to the untagged data column 511, the numeric similarity measure 517 for the tagged data column with respect to the untagged data column 511, and the holistic similarity measure 518 for the tagged data column with respect to the untagged data column 511 in order to generate the name-inclusive weighted similarity score 520 for the tagged data column with respect to the untagged data column 511. The name-exclusive weighted score determination routine 702 is configured to process the categorical similarity measure 516 for the tagged data column 512 with respect to the untagged data column 511, the numeric similarity measure 517 for the tagged data column with respect to the untagged data column 511, and the holistic similarity measure 518 for the tagged data column with respect to the untagged data column 511 in order to generate the name-exclusive weighted similarity score 521 for the tagged data column with respect to the untagged data column 511.

Returning to FIG. 5, after generating each name-inclusive weighted similarity score 520 for a tagged data column of the one or more tagged data columns 512 and each name-exclusive weighted similarity score 521 for a tagged data column of the one or more tagged data columns 512, the weighted similarity score determination engine 503 is configured to provide the name-inclusive weighted similarity scores 520 and the name-exclusive weighted similarity scores 521 to a feature-based similarity determination engine 504 of the attribute search framework computing entity 106, which is configured to process the name-inclusive weighted similarity scores 520 and the name-exclusive weighted similarity scores 521 to determine the initial related subset 522 of the one or more tagged data columns 512. In some embodiments, the feature-based similarity determination engine 504 is configured to determine whether each tagged data column of the one or more tagged data columns 512 is in the initial related subset 522 based at least in part on the name-inclusive weighted similarity score 520 for the tagged data column and the name-exclusive weighted similarity score 521 for the tagged data column.

In some embodiments, the feature-based similarity determination engine 504 is further configured to receive, from the similarity measure determination engine 502, each nominal similarity measure 515 for a tagged data column of the one or more tagged data columns 512 and/or each probabilistic similarity measure 519 for a tagged data column of the one or more tagged data columns 512. In some embodiments, the feature-based similarity determination engine 504 is configured to determine whether each tagged data column of the one or more tagged data columns 512 is in the initial related subset 522 based at least in part on the name-inclusive weighted similarity score 520 for the tagged data column, the name-exclusive weighted similarity score 521 for the tagged data column, and the nominal similarity measure 515 for the tagged data column. In some embodiments, the feature-based similarity determination engine 504 is configured to determine whether each tagged data column of the one or more tagged data columns 512 is in the initial related subset 522 based at least in part on the name-inclusive weighted similarity score 520 for the tagged data column, the name-exclusive weighted similarity score 521 for the tagged data column, and the probabilistic similarity measure 519 for the tagged data column. In some embodiments, the feature-based similarity determination engine 504 is configured to determine whether each tagged data column of the one or more tagged data columns 512 is in the initial related subset 522 based at least in part on the name-inclusive weighted similarity score 520 for the tagged data column, the name-exclusive weighted similarity score 521 for the tagged data column, the nominal similarity measure 515 for the tagged data column 512, and the probabilistic similarity measure 519 for the tagged data column.

In some embodiments, the feature-based similarity determination engine 504 determines whether each tagged data column of the one or more tagged data columns 512 is in the initial related subset 522 based at least in part on whether a threshold count of a subset of one or more feature-describing values for the tagged data column that exceed feature-describing thresholds for the one or more feature-describing values. Examples of feature-describing values for tagged data columns 512 include name-inclusive weighted similarity scores 520, name-exclusive weighted similarity scores 521 for tagged data columns 512, nominal similarity measures 515 for tagged data columns 512, and probabilistic similarity measures 519 for tagged data columns 512. In some embodiments, at least one of the following are defined by a trainable parameter of the attribute search framework computing entity 106: (i) the threshold count describing how many feature-describing values for a particular tagged data column should exceed their respective feature-describing thresholds before the particular tagged data column is included in the initial related subset 522, and (ii) the feature-describing thresholds for at least some of the one or more feature-describing values associated with the noted feature-based similarity determination engine 504.

For example, as illustrated in the operational example of FIG. 17, the feature-based similarity determination engine 504 includes a tagged data column 512 among the initial related subset 522 for an untagged data column 511 if at least one of the following conditions hold: (i) the nominal similarity measure 515 for the tagged data column 512 with respect to the untagged data column 511 equals one (e.g., the column names of the tagged data column 512 and the untagged data column 511 are deemed similar); (ii) the probabilistic similarity measure 519 for the tagged data column 512 with respect to the untagged data column 511 exceeds a probabilistic threshold $\lambda_1$; (iii) the name-inclusive weighted similarity score 520 for the tagged data column 512 with respect to the untagged data column 511 exceeds a name-inclusive threshold $\lambda_{nm}$; and (iv) the name-exclusive weighted similarity score 521 for the tagged data column 512 with respect to the untagged data column 511 exceeds a name-exclusive threshold $\lambda_{nn}$. In the illustrated example, the feature-based similarity determination engine 504 has a threshold count of one, as satisfaction of at least one of the listed conditions causes a corresponding tagged data column to be included in the initial related subset 522. However, as described above, the threshold count may be different from one and/or may be determined based at least in part on a training parameter of the attribute search framework computing entity 106. Moreover, as further described above, each of the $\lambda_1$, $\lambda_{nm}$, and $\lambda_{nn}$, may be determined based at least in part on a pre-configured value and/or based at least in part on a training parameter of the attribute search framework computing entity 106.

To train the feature-based similarity model, a training engine of the attribute search framework computing entity 106 can utilize the relationships between the tagged data columns 512. For example, during a particular iteration for training the feature-based similarity model, the training engine may select one of the tagged data columns 512 as an untagged data column 511 for the purposes of the training iteration. The training engine may then process the selected untagged data column 511 and the remaining tagged data columns 512 in accordance with the process depicted in FIG. 5 to determine an inferred related subset for the selected untagged data column 511. Thereafter, the training engine may compare the inferred related subset for the selected untagged data column 511 to the ground-truth related subset for the selected untagged data column 511 as determined by pre-existing cross-column relationship data for the tagged data columns 512 in order to generate an error function for the feature-based similarity model. The training engine may next set one or more trainable parameters of the feature-based similarity model in order to optimize the generated error function, e.g., using a gradient-based optimization routine. As noted above, the training parameters for the feature-based similarity model may include at least one of the following: (i) the weight values for the feature-based similarity measures which are in turn used to generate the combined similarity scores, (ii) at least some of the feature-describing thresholds utilized by the feature-based similarity determination engine 504, and (iii) the threshold count utilized by the feature-based similarity determination engine 504.

In some embodiments, generating the feature-based similarity model comprises performing one or more model training iterations using the one or more tagged data columns to generate the feature-based similarity model, where each first model training iteration of the one or more first model training iterations is configured to update the one or more similarity measure weight values in order to optimize a model measure of error between model outputs generated by the feature-based similarity model and ground-truth column relationship data for the one or more tagged data columns. In some of the noted embodiments, the one or more model training iterations comprise: (1) a first subset of the one or more model training iterations configured to update: (i) a nominal similarity measure weight value of the one or more similarity measure weight values for a nominal similarity measure, (ii) a name-inclusive categorical similarity measure weight value of the one or more similarity measure weight values for a categorical similarity measure, (iii) a name-inclusive numeric similarity measure weight value of the one or more similarity measure weight values for a numeric similarity measure, and (iv) a name-inclusive holistic similarity measure weight value of the one or more similarity measure weight values for a holistic similarity measure; and (2) a second subset of the one or more model training iterations configured to update: (i) a name-exclusive categorical similarity measure weight value of the one or more similarity measure weight values for the categorical similarity measure, (ii) a name-exclusive numeric similarity measure weight value of the one or more similarity measure weight values for the numeric similarity measure, and (iii) a name-exclusive holistic similarity measure weight value of the one or more similarity measure weight values for the holistic similarity measure.

Deep-Learning-Based Similarity Models

Returning to FIG. 4, at step/operation 402, the attribute search framework computing entity 106 processes the initial related subset in accordance with a deep-learning-based similarity model to generate an updated related subset of a plurality of tagged augmented data columns associated the initial related subset. In some embodiments, the deep-learning-based similarity model is configured to: (i) generate a plurality of augmented data columns comprising a plurality of tagged augmented data columns and a plurality of untagged data columns based at least in part on the plurality of input data columns, (ii) generate an image representation for each augmented data column of the plurality of augmented data columns, (iii) generate a vector representation for each augmented data column of the plurality of augmented data columns by processing the image representation associated with the augmented data column in accordance with one or more trained image processing models, and (iv) generate the updated related subset based at least in part on each vector representation for an augmented data column of the plurality of augmented data columns.

An augmented data column for a corresponding non-augmented data column may refer to a data column that is associated with the same set of data values as the non-augmented data column, but where the ordering of the set of data values in the augmented data column is different from the ordering of the corresponding non-augmented data column. For example, an augmented data column may be generated by randomly shuffling data values associated with a corresponding non-augmented data column. As another example, a computer system may generate multiple augmented data columns for each non-augmented data column by shuffling the data values of the non-augmented data column in accordance with one or more shuffling orders, where each shuffling order includes one or more value order replacements for the data values in the non-augmented data column. Thus, a first augmented data column may be associated with a shuffling order that requires moving each nth data value of the non-augmented data column to an n+1th position as well as moving the last value of the non-augmented data column to a first portion, a second augmented data column may be associated with a shuffling order that requires moving each odd-number-positioned data value of the augmented data column to the immediately succeeding even-numbered position and moving each even-number-positioned data value of the augmented data column to the immediately preceding odd-numbered position, a third augmented data column may be associated with a shuffling order that requires preserving the order of the non-augmented data column except making one or more specified value order replacements (e.g., moving the first value to the tenth position), and/or the like.

An image representation for a corresponding data column may refer to a data object that describes an image, where at least some of the pixel values of the pixels associated with the noted image are determined based at least in part on a feature of the corresponding data column. For example, an image representation for an augmented data column may refer to a data object that describes an image having a group of pixel values, where each pixel value among the group of pixel values may be determined based at least in part on a numeric representation (e.g., a one-hot-encoding-based numeric representation) of a character associated with the data values for the augmented data column.

A deep-learning-based similarity model may refer to a data object that describes parameters and/or operations of a machine learning model that is configured to detect cross-column relationships between a group of data columns based at least in part on processing image representations of the group of data columns using trained image processing models in order to generate vector representation of the group of data columns and based at least in part on comparing vector representations of the group of data columns. For example, a deep-learning-based similarity model may be configured to: (i) generate a plurality of augmented data columns comprising a plurality of tagged augmented data columns and a plurality of untagged data columns based at least in part on a plurality of input data columns, (ii) generate an image representation for each augmented data column of the plurality of augmented data columns, (iii) generate a vector representation for each augmented data column of the plurality of augmented data columns by processing the image representation associated with the augmented data column in accordance with one or more trained image processing models, and (iv) generate an updated related subset of the plurality of tagged augmented data columns based at least in part on each vector representation for an augmented data column of the plurality of augmented data columns.

In some embodiments, step/operation 402 may be performed in accordance with the process depicted in FIG. 8. The process depicted in FIG. 8 begins when a column augmentation engine 801 of the attribute search framework computing entity 106 processes the untagged data column 511 and each tagged data column in the initial related subset 522 to generate a plurality of augmented data columns 811. The plurality of augmented data columns 811 include a plurality of tagged augmented data columns which each augmented data column for each tagged data column in the initial related subset and a plurality of untagged data columns which include augmented data columns for the untagged data column. In some embodiments, the column augmentation engine 801 is configured to generate a desirable number of augmented data columns for each input data column (e.g., for the untagged data column 511 or for one of the tagged data columns 512 in the initial related subset 522), where the desired number augmented data columns for each input data column may be preconfigured (e.g., may be twenty-four), may be dynamically-generated, and/or may be determined based at least in part on a trainable parameter of the deep-learning-based similarity model. The plurality of augmented data columns 811 may include the non-augmented versions of the plurality of input data columns i.e., the untagged data column 511 and the one or more tagged data columns 512.

In some embodiments, prior to generating augmented data columns for an input data column (e.g., for the untagged data column 511 or for one of the tagged data columns 512 in the initial related subset 522), the column augmentation engine 801 removes at least some of null/missing data values from the noted input data column and/or replaces each of at least some of null/missing value in the noted input data column with a corresponding randomly-generated value for the noted null/missing value in the input data column. In some embodiments, subsequent to generating an augmented data column, the column augmentation engine 801 removes at least some of null/missing data values from the noted augmented data column and/or replaces each of at least some of null/missing value in the noted augmented data column with a corresponding randomly-generated value for the noted null/missing value in the noted augmented data column.

In some embodiments, prior to generating augmented data columns for an input data column (e.g., for the untagged data column 511 or for one of the tagged data columns 512 in the initial related subset 522), the column augmentation engine 801 introduces/adds null values values to the input data columns. In some embodiments, prior to generating augmented data columns for an input data column (e.g., for the untagged data column 511 or for one of the tagged data columns 512 in the initial related subset 522), the column augmentation engine 801 deletes values at random locations of the input data columns. In some embodiments, the noted missing value insertion (including null value insertion and/or random value deletion) operations are performed to increase variability in training data and/or mimic real life scenarios where many columns will have some percentage of values missing. This will help in creating augmented columns which look similar to real life columns. In some embodiments, subsequent to missing value insertion, the column augmentation engine 801 shuffles the updated input data columns.

In some embodiments, generating the plurality of augmented data columns comprises performing missing value remediation on the plurality of input data columns to generate a plurality of updated data columns; for each updated data column of the plurality of updated data columns, shuffling a row-wise ordering of the updated data column to generate a predefined number of shuffled data columns for the updated data column; and determining the plurality of augmented data columns based at least in part on each predefined number of shuffled data columns for an updated data column of the plurality of updated data columns. In some of the noted embodiments, performing missing value remediation on an input data column includes replacing each null/missing value that is associated with the noted input data column with a corresponding randomly-generated value for the noted null/missing value in the input data column. In some embodiments, the predefined number of shuffled data columns that should be generated for each updated data column is determined based at least in part on a trained column augmentation weight value of the deep-learning-based similarity model.

An operational example of performing the steps/operations performed by the column augmentation engine 801 is depicted in FIG. 9. As depicted in FIG. 9, the column augmentation engine 801 performs two routines: (i) a column randomization module 901 configured to generate three augmented data columns 912, 913, 914 for the input data column 911, which may be the untagged data column 511 or one of the tagged data columns 512 in the initial related subset 522; and (ii) a missing value correction module 902 configured to replace the null/missing data values in the input data column 911 and/or the null/missing data values in the augmented data columns 912, 913, 914 with a corresponding randomly-generated value for each noted null/missing value.

Returning to FIG. 8, the column augmentation engine 801 provides plurality of augmented data columns 811 to an image generation engine 802 of the attribute search framework computing entity 106, which is configured to process each augmented data column in the plurality of augmented data columns 811 to generate a group of image representations 812 which include a corresponding image representation for each augmented data column in the plurality of augmented data columns 811. In some embodiments, generating the image representation for an augmented data column of the plurality of augmented data columns 811 includes identifying one or more character designations of the augmented data column, where the one or more character designations comprise an end-of-row (EOR) character designation for each row value associated with the augmented data column; for each character designation of the one or more character designations of the augmented data column, generating a per-character one-hot-encoding in accordance with a one-hot-encoding scheme; and generating the image representation to depict each per-character one-hot-encoding for a character designation of the one or more character designations for the augmented data column.

In some embodiments, to generate the image representation for a particular augmented data column of the plurality of augmented data columns 811, the image generation engine 802 performs the steps/operations of the process depicted in FIG. 10. The process depicted in FIG. 10 begins at step/operation 1001 when the image generation engine 802 identifies one or more character designations of the augmented data column. A character designation of a data column may be a data object that describes one or more of the following: (i) a character that appears in the column name of the data column and/or that appears in a data value associated with the data column, (ii) end of the column name of the data column, and (iii) end of a portion of the data values for the data column that relate to a particular data field. For example, if a data column includes the data values "Atlanta" for a first field, "Miami" for a second field, and "Boston" for a third field, the character designations for the data column may include "A," "T," "L," "A," "N," "T," "A," "End of Field" (EOR), "M," "I," "A," "M," "I," "EOR," "B," "O," "S," "T," "O," "N." As another example, if a data column named "City" includes the data values "Atlanta" for a first field, "Miami" for a second field, and "Boston" for a third field, the character designations for the data column may include "C," "I," "T," "Y," "EOR," "A," "T," "L," "A," "N," "T," "A," "EOR," "M," "I," "A," "M," "I," "EOR," "B," "O," "S," "T," "O," "N."

At step/operation 1002, the image generation engine 802 generates a per-character one-hot-encoding for each character designation in accordance with a one-hot-encoding scheme. A one-hot-encoding scheme may be a data object that defines, for each potential character designation of a group of potential character designations, a unique numeric representation that consists of a combination of zeros and ones. The per-character one-hot-encoding for a particular character designation is a data object that describes the unique numeric representation for the particular character designation as determined in accordance with a corresponding one-hot-encoding scheme.

An operational example of a one-hot-encoding scheme 1100 is depicted in FIG. 11. As depicted in FIG. 11, the one-hot-encoding scheme 1100 includes a unique numeric representation consisting of ones and zeros for each potential character designation of the group of potential character designations 1101, including the EOR character designation 1104. For example, as depicted in the one-hot-encoding scheme 1100 of FIG. 11, the character designation "a" is associated with the unique numeric representation 1102 while the character designation "b" is associated with the unique numeric representation 1113. While various embodiments of the present invention describe mapping character designations to numeric representations consisting of a combination of zeros of ones (i.e., having a selection range of zero and one), a person of ordinary skill in the relevant technology will recognize that character designations may be mapped to numeric representations having different selection ranges and/or to non-numeric representations, such as to symbolic representations associated with selection ranges that consists of non-numeric symbols.

Returning to FIG. 10, at step/operation 1003, the image generation engine 802 generates the image representation for the augmented data column to illustrate an ordered depiction of each per-character one-hot-encoding for a character designation of the one or more character designations for the augmented data column. For example, the image generation engine 802 may generate an image representation that illustrates an ordered depiction of per-field one-hot-encodings, where each per-field one-hot-encoding includes an ordered depiction of each per-character one-hot-encoding for a character designation that appears in the data value in the augmented data column that corresponds to a particular field.

An operational example of performing the step/operation 1003 is depicted in FIG. 12. As depicted in FIG. 12, an image generation routine 1201 converts the augmented data column 1211 to the image representation 1212. The image representation 1212 includes the per-character one-hot-encodings for each character designation of the augmented data column 1211 in ordered per-field groupings. For example, the per-field one-hot-encoding 1223 may correspond to the data value 1221 that is in the first field of the augmented data column 1211, with the per-character one-hot-encoding 1231 corresponding to the letter "a" (the first letter of "abc," which is the string value of the data value 1221), the per-character one-hot-encoding 1232 corresponding to the letter "b" (the second letter of "abc," which is the string value of the data value 1221), the per-character one-hot-encoding 1233 corresponding to the letter "c" (the third letter of "abc," which is the string value of the data value 1221), and per-character one-hot-encoding 1234, which corresponds to the EOR character.

Returning to FIG. 5, after generating the image representations 812 of the augmented data columns, the image generation engine 802 provides the image representations 812 to a deep learning engine 803 of the attribute search framework computing entity 106, which is configured to process the image representations 812 using one or more trained image processing models in order to generate a group of vector representations 813 that include a vector representation for each augmented data column of the plurality of augmented data columns. trained image processing model may be a data object that describes operations and/or parameters of a model having at least one trained parameter, where the model is configured to generate a vector representation of an image representation. An example of a trained image processing model is a convolutional neural network model, an autoencoder model (e.g., a regular autoencoder model, a variational autoencoder model, and/or the like) generated as part of an encoder-decoder architecture, a convolutional-network-based encoder model, and/or the like. In some embodiments, a computer system may utilize two or more image processing models each configured to generate a per-model vector representation, such as one-dimensional convolutional neural network autoencoder model and a two-dimensional convolutional neural network model. In some of the noted embodiments, the per-model vector representations for an image representation are combined to generate the vector representation for the image representation.

In some embodiments, generating a vector representation of an image representation includes processing the image representation for the augmented data column using a one-dimensional convolutional neural network autoencoder model of the one or more trained image processing models in order to generate a vector representation for the augmented data column, where the one-dimensional convolutional neural network autoencoder model has been trained to minimize a one-dimensional image reconstruction error of a one-dimensional convolutional-neural-network-based encoder-decoder architecture.

In some embodiments, generating a vector representation of an image representation includes processing the image representation for the augmented data column using a two-dimensional convolutional neural network autoencoder model of the one or more trained image processing models in order to generate a vector representation for the augmented data column, where the two-dimensional convolutional neural network autoencoder model has been trained to minimize a two-dimensional image reconstruction error of a two-dimensional convolutional-neural-network-based encoder-decoder architecture.

In some embodiments, generating a vector representation for an augmented data column of the plurality of augmented data columns comprises processing the image representation for the augmented data column using a one-dimensional convolutional neural network autoencoder model of the one or more trained image processing models in order to generate a first vector representation for the augmented data column, wherein the one-dimensional convolutional neural network autoencoder model has been trained to minimize a one-dimensional image reconstruction error of a one-dimensional convolutional-neural-network-based encoder-decoder architecture; processing the image representation for the augmented data column using a two-dimensional convolutional neural network autoencoder model of the one or more trained image processing models in order to generate a second vector representation for the augmented data column, wherein the two-dimensional convolutional neural network autoencoder model has been trained to minimize a two-dimensional image reconstruction error of a two-dimensional convolutional-neural-network-based encoder-decoder architecture; and combining the first vector representation and the second vector representation to generate the vector representation for the augmented data column.

In some embodiments, when the trained image processing models include one or more autoencoder models, the attribute search framework computing entity 106 trains each of the noted autoencoder models by: (i) processing training input images using the autoencoder model in order to generate a vector representations for the training input images, (ii) processing the vector representations using a decoder model to generate reconstructed images, and (iii) setting the parameters of the autoencoder model based at least in part on a measure of deviation between the training input images and the reconstructed images, e.g., using a gradient-descent-based training routine.

After generating the vector representations 813, the deep learning engine 803 provides the vector representations 813 to a deep-learning-based similarity determination engine 804 of the attribute search framework computing entity 106, which is configured to process the vector representations 813 for the plurality of tagged augmented data objects to determine an updated related subset 814 of the one or more tagged data columns in the initial related subset based at least in part on a subset of the plurality of tagged augmented data objects that are deemed most similar to the plurality of untagged augmented data objects based at least in part on measures of similarity between the vector representations of plurality of tagged augmented data objects and the vector representations of the plurality of untagged augmented data objects.

In some embodiments, in order to generate the updated related subset 814, the deep-learning-based similarity determination engine 804 first determines, for each column pair of a plurality of column pairs comprising a tagged augmented data column of the plurality of tagged augmented data columns and an untagged augmented data column of the plurality of untagged augmented data columns, a measure of vector similarity of a tagged vector representation for the tagged augmented data column in the column pair and an untagged vector representation for the untagged augmented data column in the column pair. Afterward, the deep-learning-based similarity determination engine 804 identifies a predefined number (e.g., one) of the plurality of column pairs having a highest measure of vector similarity and determines the updated related subset to include each tagged data column of the one or more tagged data columns that associated with at least one at least one of the identified predefined number of the plurality of column pairs.

In some embodiments, in order to generate the updated related subset 814, the deep-learning-based similarity determination engine 804 first determines, for each column pair of a plurality of column pairs comprising a tagged augmented data column of the plurality of tagged augmented data columns and an untagged augmented data column of the plurality of untagged augmented data columns, a measure of vector similarity of a tagged vector representation for the tagged augmented data column in the column pair and an untagged vector representation for the untagged augmented data column in the column pair. Afterward, the deep-learning-based similarity determination engine 804 identifies a group of the plurality of column pairs whose measure of vector similarity exceeds a vector similarity threshold value and determines the updated related subset to include each tagged data column of the one or more tagged data columns that associated with at least one at least one of the identified group of the plurality of column pairs.

Cross-Column Relationship Detection User Interfaces

Returning to FIG. 4, at step/operation 403, the attribute search framework computing entity 106 is configured to display the updated related subset using a cross-column relationship detection user interface. In some embodiments, the deep-learning-based similarity model is further configured to generate, for each augmented data column of the plurality of augmented data columns that is in the updated related subset, a relatedness likelihood value; and the cross-column relationship detection user interface is configured to display each relatedness likelihood value for an augmented data column of the plurality of augmented data columns that is in the updated related subset.

In some embodiments, the cross-column relationship detection user interface is determined based at least in part on model input data that is provided using a column designation user interface. An operational example of a column designation user interface 1300 is depicted in FIGS. 13A-13B, which is a user interface configured to enable user designation of metadata information, tagged attribute designations, and untagged attribute designations for a corresponding cross-database relationship detection iteration. As depicted, the column designation user interface 1300 includes an iteration name designation user interface element 1301, an iteration description designation user interface element 1302, a tagged data column designation trigger icon 1303, an untagged data column designation trigger icon 1304, and an iteration execution trigger icon 1305. User input to the iteration name designation user interface element 1301 and the iteration description designation user interface element 1302 provide iteration metadata information that can be used to designate outputs of the cross-database relationship detection iteration. In some embodiments, after supplying the tagged data attributes and the untagged data attributes for the cross-database relationship detection iteration, the column designation user interface 1300 may have the arrangement depicted in FIG. 13B.

User selection of the tagged data column designation trigger icon 1303 can lead to display of the tagged data column designation user interface 1400 of FIGS. 14A-15B, which enables display of tagged data attributes based at least in part on subject matter groupings of the tagged data columns and user selection of tagged data attributes for the cross-database relationship detection iteration. Within the tagged data column designation user interface 1400, user selection of a subject matter grouping can lead to expansion of the subject matter grouping, which causes of display of tagged data columns that are associated with the subject matter grouping and enables selecting the displayed tagged data columns that are associated with the selected subject matter grouping. For example, user selection of the subject matter grouping 1401 leads to display of the tagged data columns 1402, as depicted in FIG. 14B. Furthermore, within the tagged data column designation user interface 1400, user selection of the add icon 1403 causes addition of selected tagged data columns to a list of designated tagged data columns 1404, and user selection of the save icon 1405 causes final designation of the designated tagged data attributes as the tagged data attributes for the cross-database relationship detection iteration as well as a return to column designation user interface 1300.

User selection of the untagged data column designation trigger icon 1304 can lead to display of the untagged data column designation user interface 1500 of FIGS. 15A-15B, which enables user selection of the untagged data columns for the cross-database relationship detection iteration. Within the untagged data column designation user interface 1500, user input to the user interface elements 1501 provides an identification of database tables associated with the untagged data columns, while user interaction with the user interface elements 1502 enables designation of particular untagged data columns as the untagged data columns for the cross-database relationship detection iteration. The untagged data column designation user interface 1500 includes a save button (not depicted, similar to 1405), where user selection of the save button causes final designation of the designated untagged data attributes as the untagged data attributes for the cross-database relationship detection iteration as well as a return to column designation user interface 1300.

User selection of the iteration execution trigger icon 1305 causes the performance of the cross-database relationship detection iteration based at least in part on the input data indicated in the tagged data identification user interface element 1311 and the untagged data identification user interface element 1312 and display of the cross-column relationship detection user interface 1600 of FIG. 16, which includes determined relationships between untagged data columns 1601 and tagged data columns 1602, relationship scores 1603 for each determined relationship, and a user feedback input user interface element 1604 which enables user confirmation or rejection of a determined relationship, which in turn provides new ground-truth data which can be used to train one or both of the feature-based similarity model and the deep-learning-based similarity model.

Parallel Training of a Feature-Based Similarity Model and a Deep-Learning Model

A feature-based similarity model and a deep-learning model may be trained in parallel even if the two trained models are used in a joint manner, such as in the pipelined manner described in FIG. 4. For example, generating the feature-based similarity model and the deep-learning-based similarity model may include performing one or more first model training iterations using the one or more tagged data columns to generate the feature-based similarity model, wherein each first model training iterations of the one or more first model training iterations is configured to update the one or more similarity measure weight values in order to optimize a first model measure of error between first model outputs generated by the feature-based similarity model and ground-truth column relationship data for the one or more tagged data columns; and performing one or more second model training iterations using the one or more tagged data columns to generate the deep-learning-based similarity model, wherein each second model training iterations of the one or more second model training iterations is configured to update one or more image processing weight values of the one or more image processing models in order to optimize a second model measure of error between second model outputs generated by the deep-learning-based similarity model and the ground-truth column relationship data for the one or more tagged data columns. In some of the noted embodiments, the one or more first model training iterations and the one or more second model training iterations are determined independent of each other.

In some of the noted embodiments noted above, the one or more first model training iterations for training the feature-based similarity model comprise a first subset of the one or more model training iterations configured to update: (i) a nominal similarity measure weight value of the one or more similarity measure weight values for a nominal similarity measure, (ii) a name-inclusive categorical similarity measure weight value of the one or more similarity measure weight values for a categorical similarity measure, (iii) a name-inclusive numeric similarity measure weight value of the one or more similarity measure weight values for a numeric similarity measure, and (iv) a name-inclusive holistic similarity measure weight value of the one or more similarity measure weight values for a holistic similarity measure; and a second subset of the one or more model training iterations configured to update: (i) a name-exclusive categorical similarity measure weight value of the one or more similarity measure weight values for the categorical similarity measure, (ii) a name-exclusive numeric similarity measure weight value of the one or more similarity measure weight values for the numeric similarity measure, and (iii) a name-exclusive holistic similarity measure weight value of the one or more similarity measure weight values for the holistic similarity measure.

VI. CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method for detecting cross-column relationships among a plurality of input data columns comprising an untagged data column associated with a first database and one or more tagged data columns associated with a second database, the computer-implemented method comprising:
for each tagged data column of the one or more tagged data columns, determining, using one or more processors, a feature-based similarity measure set comprising one or more feature-based similarity measures, wherein determining the one or more feature-based similarity measures for a particular tagged data column of the one or more tagged data columns comprises:
determining one or more tagged feature values for the particular tagged data column and one or more untagged feature values for the particular tagged data column,
determining a nominal similarity measure of the one or more feature-based similarity measures for the particular tagged data column based at least in part on a tagged nominal subset of the one or more tagged feature values and an untagged nominal subset of the one or more untagged feature values,
determining a categorical similarity measure of the one or more feature-based similarity measures for the particular tagged data column based at least in part on a tagged categorical subset of the one or more tagged feature values and an untagged categorical subset of the one or more untagged feature values,
determining a numeric similarity measure of the one or more feature-based similarity measures for the particular tagged data column based at least in part on a tagged numeric subset of the one or more tagged feature values and an untagged numeric subset of the one or more untagged feature values,
determining a holistic similarity measure of the one or more feature-based similarity measures for the particular tagged data column based at least in part on the one or more tagged feature values for the particular tagged data column and the one or more untagged feature values for the untagged data column, and
determining a probabilistic similarity measure of the one or more feature-based similarity measures for the particular tagged data column based at least in part on the tagged categorical subset and the untagged categorical subset; and
performing, using the one or more processors and based at least in part on each feature-based similarity measure set, one or more database consolidation operations with respect to the first database and the second database to generate a consolidated database.

2. The computer-implemented method of claim 1, wherein the holistic similarity measure for the particular tagged data column is determined based at least in part on a Gowers distance of the tagged categorical subset and the untagged categorical subset.

3. The computer-implemented method of claim 1, wherein the categorical similarity measure for the particular tagged data column is determined based at least in part on a Sorensen—Dice coefficient for the tagged categorical subset associated with the particular tagged data column and the untagged categorical subset.

4. The computer-implemented method of claim 1, wherein the probabilistic similarity measure for the particular tagged data column is determined based at least in part on a Jaccard similarity measure for the tagged categorical subset associated with the particular tagged data column and the untagged categorical subset.

5. The computer-implemented method of claim 1, wherein the numeric similarity measure for the particular tagged data column is determined based at least in part on a Euclidean distance measure for the tagged numeric subset associated with the particular tagged data column and the untagged numeric subset.

6. The computer-implemented method of claim 1, wherein the nominal similarity measure for the particular tagged data column is determined based at least in part on a cosine similarity measure that is determined based at least in part on a first term-frequency-inverse-document-frequency vector of the tagged nominal subset for the particular tagged data column and a second term-frequency-inverse-document-frequency vector of the untagged nominal subset.

7. The computer-implemented method of claim 1, wherein determining the one or more feature-based similarity measures for the particular tagged data column comprises:
determining a weighted name-inclusive similarity score of one or more weighted similarity scores for the particular tagged data column based at least in part on: (i) the nominal similarity measure for the particular tagged data column, (ii) the categorical similarity measure for the particular tagged data column, (iii) the numeric similarity measure for the particular tagged data column, (iv) the holistic similarity measure for the particular tagged data column, (v) a nominal similarity measure weight value of one or more similarity measure weight values for the nominal similarity measure, (vi) a name-inclusive categorical similarity measure weight value of the one or more similarity measure weight values for the categorical similarity measure, (vii) a name-inclusive numeric similarity measure weight value of the one or more similarity measure weight values for the numeric similarity measure, and (viii) a name-inclusive holistic similarity measure weight value of the one or more similarity measure weight values for the holistic similarity measure; and determining a weighted name-exclusive similarity score of the one or more weighted similarity scores for the particular tagged data column based at least in part on: (i) the categorical similarity measure, (ii) the numeric similarity measure, (iii) the holistic similarity measure, (iv) a name-exclusive categorical similarity measure weight value of the one or more similarity measure weight values for the categorical similarity measure, (v) a name-exclusive numeric similarity measure weight value of the one or more similarity measure weight values for the numeric similarity measure, and (vi) a name-exclusive holistic similarity measure weight value of the one or more similarity measure weight values for the holistic similarity measure.

8. The computer-implemented method of claim 7, wherein performing the one or more database consolidation operations comprises:

generating, using a feature-based similarity model and based at least in part on the plurality of input data columns, a related subset of the one or more tagged data columns for the untagged data column, wherein the feature-based similarity model is configured to: (a) for each tagged data column of the one or more tagged data columns: (i) determine the one or more feature-based similarity measures, and (ii) combine the one or more feature-based similarity measures to determine a weighted similarity score set for the tagged data column comprising the one or more weighted similarity scores for the tagged data column, and (b) determine an initial related subset based at least in part on each weighted similarity score set, and performing the one or more database consolidation operations based at least in part on the related subset.

9. The computer-implemented method of claim 8, wherein determining the initial related subset comprises:

for each tagged data column of the one or more tagged data columns, determining whether to include the tagged data column in the initial related subset based at least in part on at least one of the nominal similarity measure for the tagged data column, the weighted name-inclusive similarity score for the tagged data column, the weighted name-exclusive similarity score for the tagged data column, or the probabilistic similarity measure for the tagged data column.

10. The computer-implemented method of claim 9, further comprising:

directing, using the one or more processors, display of output data generated based at least in part on the related subset using a cross-column relationship detection user interface.

11. The computer-implemented method of claim 10, wherein directing display of the output data comprises:

generating, based at least in part on the related subset and using a deep-learning-based similarity model, an updated related subset of a plurality of tagged augmented data columns associated the initial related subset, wherein the deep-learning-based similarity model is configured to: (i) generate a plurality of augmented data columns comprising the plurality of tagged augmented data columns and a plurality of untagged data columns based at least in part on the plurality of input data columns, (ii) generate an image representation for each augmented data column of the plurality of augmented data columns, (iii) generate a vector representation for each augmented data column of the plurality of augmented data columns by processing the image representation associated with the augmented data column in accordance with one or more trained image processing models, and (iv) generate the updated related subset based at least in part on each vector representation for the plurality of augmented data columns; and displaying the updated related subset using the cross-column relationship detection user interface.

12. The computer-implemented method of claim 11, wherein:

the deep-learning-based similarity model is further configured to generate, for each augmented data column of the plurality of augmented data columns that is in the updated related subset, a relatedness likelihood value; and the cross-column relationship detection user interface is configured to display each relatedness likelihood value for the plurality of augmented data columns that is in the updated related subset.

13. The computer-implemented method of claim 11, wherein generating the feature-based similarity model and the deep-learning-based similarity model comprises:

performing one or more first model training iterations using the one or more tagged data columns to generate the feature-based similarity model, wherein each first model training iteration of the one or more first model training iterations is configured to update the one or more similarity measure weight values in order to optimize a first model measure of error between first model outputs generated by the feature-based similarity model and ground-truth column relationship data for the one or more tagged data columns; and performing one or more second model training iterations using the one or more tagged data columns to generate the deep-learning-based similarity model, wherein each second model training iteration of the one or more second model training iterations is configured to update one or more image processing weight values of one or more image processing models of the deep-learning-based similarity model in order to optimize a second model measure of error between second model outputs generated by the deep-learning-based similarity model and the ground-truth column relationship data for the one or more tagged data columns.

14. The computer-implemented method of claim 8, wherein generating the feature-based similarity model comprises:

performing one or more model training iterations using the one or more tagged data columns to generate the feature-based similarity model, wherein each first model training iterations of the one or more first model training iterations is configured to update the one or more similarity measure weight values in order to optimize a model measure of error between model outputs generated by the feature-based similarity model and ground-truth column relationship data for the one or more tagged data columns.

15. The computer-implemented method of claim 14, wherein the one or more model training iterations comprise:

a first subset of the one or more model training iterations configured to update: (i) the nominal similarity measure weight value of the one or more similarity measure weight values for the nominal similarity measure, (ii)

the name-inclusive categorical similarity measure weight value of the one or more similarity measure weight values for the categorical similarity measure, (iii) the name-inclusive numeric similarity measure weight value of the one or more similarity measure weight values for the numeric similarity measure, and (iv) the name-inclusive holistic similarity measure weight value of the one or more similarity measure weight values for the holistic similarity measure; and a second subset of the one or more model training iterations configured to update: (i) the name-exclusive categorical similarity measure weight value of the one or more similarity measure weight values for the categorical similarity measure, (ii) the name-exclusive numeric similarity measure weight value of the one or more similarity measure weight values for the numeric similarity measure, and (iii) the name-exclusive holistic similarity measure weight value of the one or more similarity measure weight values for the holistic similarity measure.

16. The computer-implemented method of claim 8, wherein:

the feature-based similarity model is generated via one or more model training iterations that use the one or more tagged data columns, and each model training iteration of the one or more model training iterations is configured to update the one or more similarity measure weight values in order to optimize a model measure of error for model outputs generated by the feature-based similarity model and ground-truth column relationship data for the one or more tagged data columns.

17. An apparatus for detecting cross-column relationships among a plurality of input data columns comprising an untagged data column associated with a first database and one or more tagged data columns associated with a second database, the apparatus comprising at least one processor and at least one memory including program code, the at least one memory and the program code configured to, with the at least one processor, cause the apparatus to at least:

for each tagged data column of the one or more tagged data columns, determine a feature-based similarity measure set comprising one or more feature-based similarity measures, wherein determining the one or more feature-based similarity measures for a particular tagged data column of the one or more tagged data columns comprises:

determining one or more tagged feature values for the particular tagged data column and one or more untagged feature values for the particular tagged data column, determining a nominal similarity measure of the one or more feature-based similarity measures for the particular tagged data column based at least in part on a tagged nominal subset of the one or more tagged feature values and an untagged nominal subset of the one or more untagged feature values, determining a categorical similarity measure of the one or more feature-based similarity measures for the particular tagged data column based at least in part on a tagged categorical subset of the one or more tagged feature values and an untagged categorical subset of the one or more untagged feature values, determining a numeric similarity measure of the one or more feature-based similarity measures for the particular tagged data column based at least in part on a tagged numeric subset of the one or more tagged feature values and an untagged numeric subset of the one or more untagged feature values, determining a holistic similarity measure of the one or more feature-based similarity measures for the particular tagged data column based at least in part on the one or more tagged feature values for the particular tagged data column and the one or more untagged feature values for the untagged data column, and determining a probabilistic similarity measure of the one or more feature-based similarity measures for the particular tagged data column based at least in part on the tagged categorical subset and the untagged categorical subset; and perform, based at least in part on each feature-based similarity measure set, one or more database consolidation operations with respect to the first database and the second database to generate a consolidated database.

18. The apparatus of claim 17, wherein the holistic similarity measure for the particular tagged data column is determined based at least in part on a Gowers distance of the tagged categorical subset and the untagged categorical subset.

19. The apparatus of claim 17, wherein the categorical similarity measure for the particular tagged data column is determined based at least in part on a Sørensen-Dice coefficient for the tagged categorical subset associated with the particular tagged data column and the untagged categorical subset.

20. A computer program product for detecting cross-column relationships among a plurality of input data columns comprising an untagged data column associated with a first database and one or more tagged data columns associated with a second database, the computer program product comprising at least one non-transitory computer-readable storage medium having computer-readable program code portions stored therein, the computer-readable program code portions configured to:

for each tagged data column of the one or more tagged data columns, determine a feature-based similarity measure set comprising one or more feature-based similarity measures, wherein determining the one or more feature-based similarity measures for a particular tagged data column of the one or more tagged data columns comprises:

determining one or more tagged feature values for the particular tagged data column and one or more untagged feature values for the particular tagged data column, determining a nominal similarity measure of the one or more feature-based similarity measures for the particular tagged data column based at least in part on a tagged nominal subset of the one or more tagged feature values and an untagged nominal subset of the one or more untagged feature values, determining a categorical similarity measure of the one or more feature-based similarity measures for the particular tagged data column based at least in part on a tagged categorical subset of the one or more tagged feature values and an untagged categorical subset of the one or more untagged feature values, determining a numeric similarity measure of the one or more feature-based similarity measures for the particular tagged data column based at least in part on a tagged numeric subset of the one or more tagged feature values and an untagged numeric subset of the one or more untagged feature values, determining a holistic similarity measure of the one or more feature-based similarity measures for the particular tagged data column based at least in part on the one or more tagged feature values for the particular tagged data column and the one or more untagged feature values for the untagged data column, and determining a probabilistic similarity measure of the one or more feature-based similarity measures for the particular tagged data column based at least in part on the tagged categorical subset and the untagged categorical subset; and perform, based at least in part on each feature-based similarity measure set, one or more database consolidation operations with respect to the first database and the second database to generate a consolidated database.

* * * * *